US012211424B2

(12) United States Patent
Kim et al.

(10) Patent No.: US 12,211,424 B2
(45) Date of Patent: Jan. 28, 2025

(54) DISPLAY PANEL DRIVING CIRCUIT AND DISPLAY DEVICE INCLUDING THE SAME

(71) Applicant: Samsung Display Co., LTD., Yongin-si (KR)

(72) Inventors: Taehoon Kim, Yongin-si (KR); Sangan Kwon, Yongin-si (KR); Soon-Dong Kim, Yongin-si (KR); Geunjeong Park, Yongin-si (KR); Changnoh Yoon, Yongin-si (KR); Jaekeun Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/418,890

(22) Filed: Jan. 22, 2024

(65) Prior Publication Data

US 2024/0371312 A1 Nov. 7, 2024

(30) Foreign Application Priority Data

May 3, 2023 (KR) ........................ 10-2023-0057541

(51) Int. Cl.

*G09G 5/00* (2006.01)
*G09G 3/00* (2006.01)
*G09G 3/20* (2006.01)
*G09G 3/32* (2016.01)

(52) U.S. Cl.

CPC ........... *G09G 3/2096* (2013.01); *G09G 3/035* (2020.08); *G09G 3/32* (2013.01); *G09G 2300/0814* (2013.01); *G09G 2310/0267* (2013.01); *G09G 2310/0286* (2013.01); *G09G 2330/021* (2013.01)

(58) Field of Classification Search

CPC ........ G09G 3/035; G09G 3/2096; G09G 3/32; G09G 3/3266; G09G 2300/0814; G09G 2310/0267; G09G 2310/0286

See application file for complete search history.

(56) References Cited

U.S. PATENT DOCUMENTS 9,886,891 B2 * 2/2018 In ......................... G09G 3/3266
10,614,732 B2 * 4/2020 Choi .................... G09G 3/3208
11,468,837 B2 10/2022 Cho et al.

(Continued)

FOREIGN PATENT DOCUMENTS

KR 1020190083393 A 7/2019
KR 1020210144400 A 11/2021
KR 1020220008951 A 1/2022

*Primary Examiner* — Joe H Cheng

(74) *Attorney, Agent, or Firm* — CANTOR COLBURN LLP

(57) ABSTRACT

A display panel driving circuit includes a scan driving circuit including a scan stage and a timing controller. The scan stage includes a first circuit connected to a first input node of receiving a first clock signal, a second circuit connected to a second input node of receiving a second clock signal, a third circuit connected to a third input node of receiving a carry signal, the first circuit, and the second circuit and connected to a first control node and a second control node, a pull-up transistor electrically connected to the first input node and an output node of outputting a scan signal and turned on/off by the first control node, and a pull-down transistor electrically connected to the output node and a low-level voltage line and turned on/off by the second control node.

20 Claims, 22 Drawing Sheets

(56) References Cited

U.S. PATENT DOCUMENTS

| | | | | |
|---|---|---|---|---|
| 11,790,854 | B2 * | 10/2023 | Song | G09G 3/3241<br>345/76 |
| 11,915,658 | B2 * | 2/2024 | Kim | G09G 3/3233 |
| 2019/0206329 | A1 | 7/2019 | Lee et al. | |
| 2020/0303468 | A1 * | 9/2020 | In | G09G 3/3225 |
| 2021/0256912 | A1 * | 8/2021 | Seo | G09G 3/3266 |
| 2021/0407427 | A1 * | 12/2021 | Lee | G09G 3/3233 |
| 2021/0407431 | A1 * | 12/2021 | Kim | G09G 3/3233 |
| 2022/0157250 | A1 * | 5/2022 | Kim | G09G 3/3266 |
| 2024/0296777 | A1 * | 9/2024 | In | G09G 3/2092 |

* cited by examiner

DISPLAY PANEL DRIVING CIRCUIT AND DISPLAY DEVICE INCLUDING THE SAME

This application claims priority to Korean Patent Application No. 10-2023-0057541, filed on May 3, 2023, and all the benefits accruing therefrom under 35 U.S.C. § 119, the content of which in its entirety is herein incorporated by reference.

BACKGROUND

1. Field

Embodiments of the disclosure described herein relate to a display panel driving circuit capable of reducing power consumption and reducing the area of a non-display area and a display device including the same.

2. Description of the Related Art

An organic light-emitting display device among display devices displays an image by an organic light-emitting diode that generates a light through the recombination of electrons and holes. The organic light-emitting display device is advantageous in that a response speed is relatively fast and power consumption is relatively small.

The organic light-emitting display device includes pixels connected to data lines and scan lines. Each of the pixels generally includes an organic light-emitting diode and a circuit unit for controlling the amount of current flowing to the organic light-emitting diode. In response to a data signal, the circuit unit controls the amount of current that flows from a first driving voltage to a second driving voltage through the organic light-emitting diode. In this case, a light of luminance corresponding to the amount of current flowing is generated through the organic light-emitting diode.

As the display device is used in various fields, nowadays, a plurality of different images may be simultaneously displayed in one display device. Accordingly, a technology for reducing power consumption of the display device where the plurality of images is displayed is desired.

SUMMARY

Embodiments of the disclosure provide a display panel driving circuit capable of reducing power consumption and reducing the area of a non-display area and a display device including the same.

In an embodiment of the disclosure, a display device may include a display panel that includes a plurality of pixels respectively connected to a plurality of scan lines, a scan driving circuit that includes a plurality of scan stages respectively corresponding to the plurality of scan lines, each of the plurality of scan stages receiving a first clock signal, a second clock signal different from the first clock signal, and a carry signal and outputs a scan signal, and a timing controller that divides the display panel into a first display area and a second display area during a multi-frequency mode and controls the scan driving circuit such that the first display area and the second display area operate at different frequencies. Each of the plurality of scan stages may include a first circuit connected to a first input node of receiving one of the first clock signal and the second clock signal, a second circuit connected to a second input node of receiving a remaining one of the first clock signal and the second clock signal, a third circuit connected to a third input node of receiving the carry signal, the first circuit, and the second circuit and connected to a first control node and a second control node, a pull-up transistor which is electrically connected to the first input node and an output node of outputting the scan signal and is turned on or off by the first control node, and a pull-down transistor which is electrically connected to the output node and a low-level voltage line and is turned on or off by the second control node. In the multi-frequency mode, the timing controller may mask a partial period of the first clock signal provided to a scan stage connected to the second display area from among the plurality of scan stages.

In an embodiment, in the first clock signal, a first voltage and a second voltage different from the first voltage may be repeated at a given period.

In an embodiment, the first voltage may be higher in level than the second voltage, and a phase of the second clock signal may be opposite to a phase of the first clock signal.

In an embodiment, when the first clock signal is masked, each of the plurality of scan stages may output the scan signal having the second voltage.

In an embodiment, a masked first clock signal may have the second voltage.

In an embodiment, the second voltage may be provided to the low-level voltage line.

In an embodiment, each of the first circuit and the second circuit may include a NOT gate.

In an embodiment, the third circuit may include a first shift register that is connected to the first input node and receives the carry signal, and a second shift register that is connected to the second input node, the first control node, and the second control node and receives a signal output from the first shift register.

In an embodiment, the third circuit may include a latch.

In an embodiment, the third circuit may include a flip-flop.

In an embodiment, each of the pull-up transistor and the pull-down transistor may be a p-channel metal-oxide-semiconductor ("PMOS") transistor.

In an embodiment, the first display area may operate at a first driving frequency, and the second display area may operate at a second driving frequency lower than the first driving frequency.

In an embodiment, the pull-up transistor may include a first source node connected to the first input node, a first drain node connected to the output node, and a first gate node connected to the first control node, and the pull-down transistor includes a second source node connected to the output node, a second drain node connected to the low-level voltage line, and a second gate node connected to the second control node.

In an embodiment, each of the pull-up transistor and the pull-down transistor may be an n-channel metal-oxide-semiconductor ("NMOS") transistor.

In an embodiment, a first scan stage among the plurality of scan stages may receive the carry signal from the timing controller, and each of remaining scan stages of the plurality of scan stages may receive, as the carry signal, the scan signal output from a previous scan stage.

In an embodiment of the disclosure, a display panel driving circuit may include a scan driving circuit that includes a scan stage receiving a first clock signal, a second clock signal different from the first clock signal, and a carry signal and outputting a scan signal, and a timing controller that controls the scan driving circuit. The scan stage may include a first circuit connected to a first input node of receiving the first clock signal, a second circuit connected to a second input node of receiving the second clock signal, a third circuit connected to a third input node of receiving the carry signal, the first circuit, and the second circuit and connected to a first control node and a second control node, a pull-up transistor electrically connected to the first input node and an output node of outputting the scan signal and turned on/off by the first control node, and a pull-down transistor electrically connected to the output node and a low-level voltage line and turned on/off by the second control node.

In an embodiment, the timing controller may mask a partial period of the first clock signal provided to the scan stage.

In an embodiment, each of the first circuit and the second circuit may include a NOT gate.

In an embodiment, the third circuit may include a first shift register that is connected to the first input node and receives the carry signal, and a second shift register that is connected to the second input node, the first control node, and the second control node and receives a signal output from the first shift register. In an embodiment, the third circuit may include a latch or a flip-flop.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
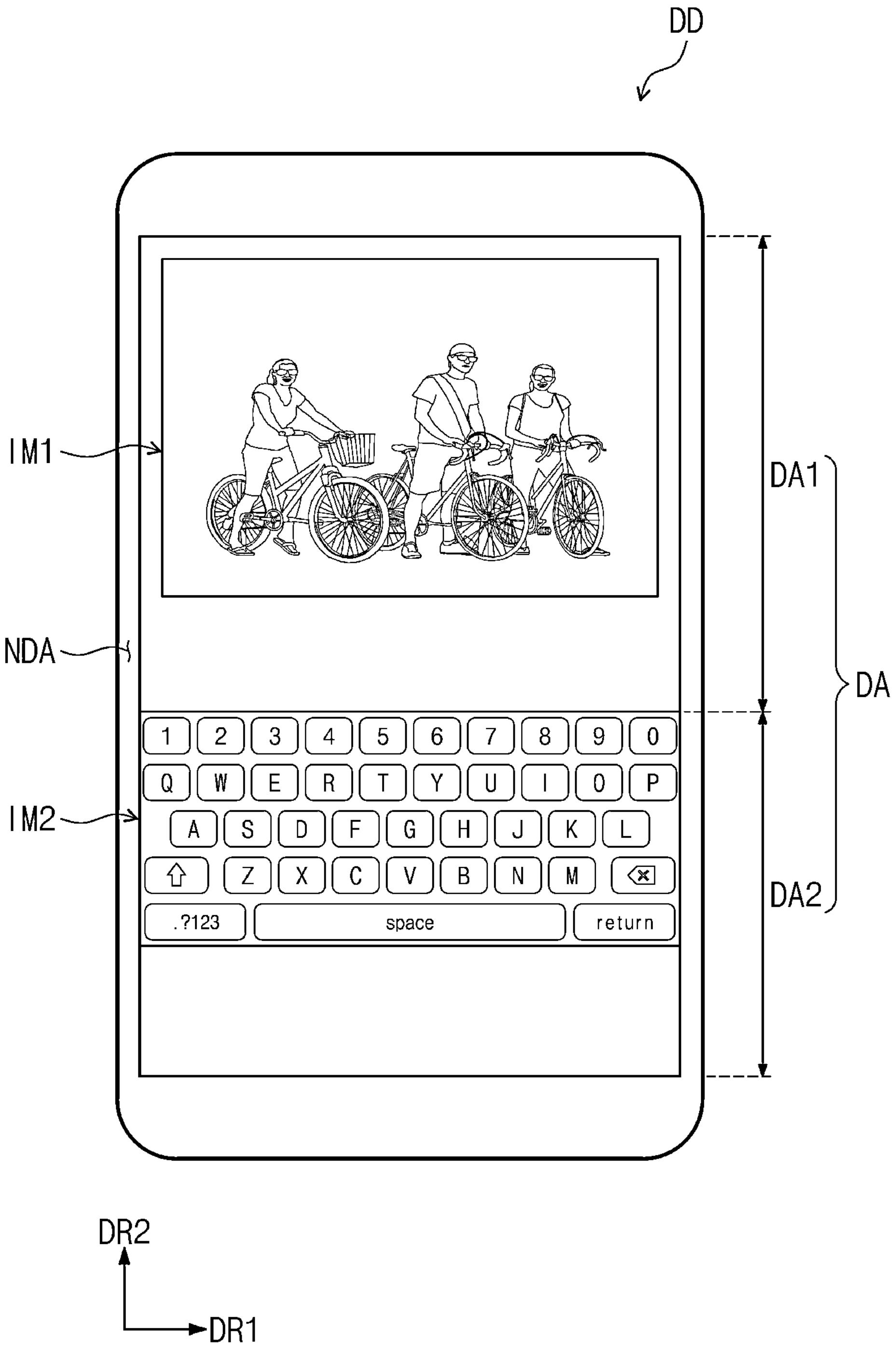
FIG. 1 is a plan view of an embodiment of a display device according to the disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

Like reference numerals refer to like components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the disclosure will be described with reference to drawings.

FIG. 1 is a plan view of an embodiment of a display device according to the disclosure.

Referring to FIG. 1, a portable terminal is illustrated in an embodiment of a display device DD according to the disclosure. The portable terminal may include a tablet, a personal computer ("PC"), a smartphone, a personal digital assistant ("PDA"), a portable multimedia player ("PMP"), a game console, a wristwatch-type electronic device, etc. However, the disclosure is not limited thereto. The disclosure may be used for relatively small and medium-sized display devices such as a PC, a notebook computer, a kiosk, an automotive navigation unit, and a camera, in addition to a large-sized display device such as a television or an outside billboard. The above examples are provided only in an embodiment, and it is obvious that the display device DD is capable of being applied to any other electronic device(s) without departing from the concept of the disclosure.

As illustrated in FIG. 1, a display surface on which a first image IM1 and a second image IM2 are displayed is parallel to a plane defined by a first direction DR1 and a second direction DR2. The display device DD may include a plurality of areas that are distinguished from each other on the display surface. The display surface may include a display area DA in which the first image IM1 and the second image IM2 are displayed and a non-display area NDA adjacent to the display area DA. The non-display area NDA may be referred to as a bezel area. In an embodiment, the display area DA may be in the shape of a quadrangle, for example. The non-display area NDA may surround the display area DA. Also, although not illustrated, the display device DD may include a shape whose portion is curved. In this case, one area of the display area DA may have a curved shape.

The display area DA of the display device DD includes a first display area DA1 and a second display area DA2. In a predetermined application program, the first image IM1 may be displayed in the first display area DA1, and the second image IM2 may be displayed in the second display area DA2. In an embodiment, the first image IM1 may be a video, and the second image IM2 may be a still image or text information having a long change period, for example.

Driving frequencies of the first display area DA1 and the second display area DA2 may be different from each other.

According to the disclosure, the display device DD may drive the first display area DA1, in which the video is displayed, at a normal frequency and may drive the second display area DA2, in which the still image is displayed, at a frequency lower than the normal frequency. The display device DD may reduce power consumption by decreasing the driving frequency of the second display area DA2.

The sizes of the first display area DA1 and the second display area DA2 may be determined in advance and may be changed by an application program. In an embodiment, when the still image is displayed in the first display area DA1 and the video is displayed in the second display area DA2, the first display area DA1 may be driven at a relatively low frequency, and the second display area DA2 may be driven at the normal frequency. Besides, the display area DA may be divided into three or more display areas. A driving frequency of each of the three or more display areas may be determined depending on a type of an image that is displayed therein (e.g., depending on whether an image displayed therein is a still image or a video).

Figure 2A:
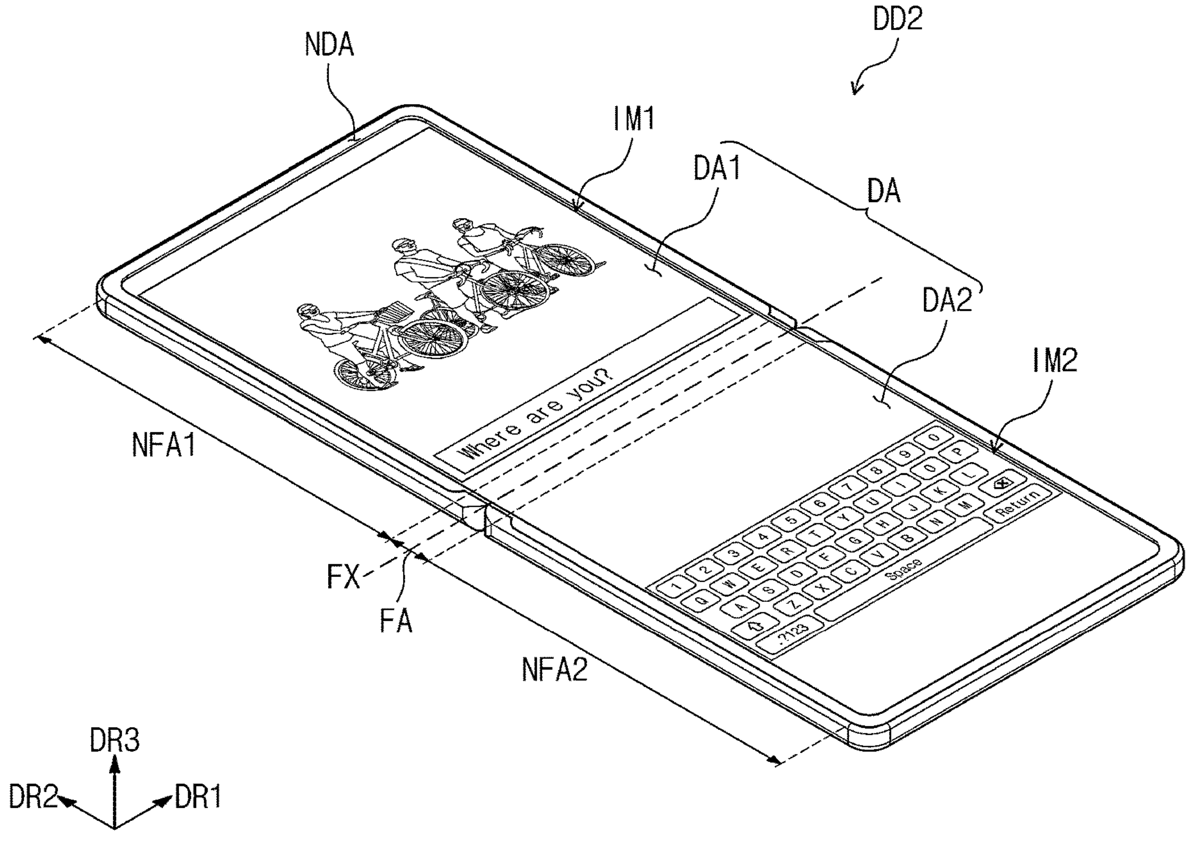
FIGS. 2A and 2B are perspective views of an embodiment of a display device according to the disclosure.
Figure 2B:
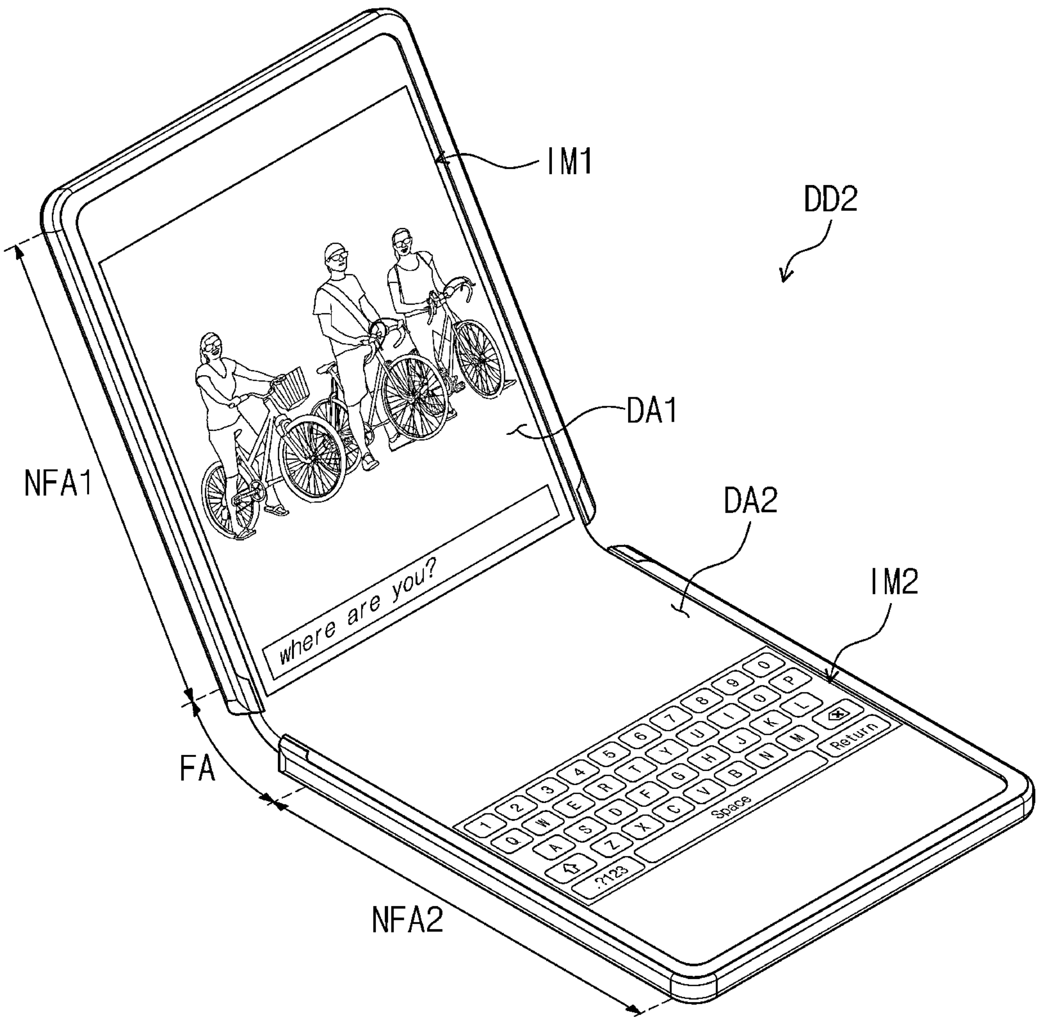

FIGS. 2A and 2B are perspective views of an embodiment of a display device according to the disclosure. FIG. 2A shows a state where a display device is unfolded, and FIG. 2B shows a state where a display device is folded.

Referring to FIGS. 2A and 2B, a display device DD2 includes the display area DA and the non-display area NDA. The display device DD2 may display an image through the display area DA. The display area DA may include the plane defined by the first direction DR1 and the second direction DR2, with the display device DD2 unfolded. A thickness direction of the display device DD2 may be parallel to a third direction DR3 intersecting a plane defined by the first direction DR1 and the second direction DR2. Front surfaces (or upper surfaces) and rear surfaces (or lower surfaces) of members constituting the display device DD2 may be defined with respect to the third direction DR3. The non-display area NDA may be referred to as a bezel area. In an embodiment, the display area DA may be in the shape of a quadrangle. The non-display area NDA may surround the display area DA.

The display area DA may include a first non-folding area NFA1, a folding area FA, and a second non-folding area NFA2. The folding area FA may be bent about a folding axis FX extending in the first direction DR1.

When the display device DD2 is folded, the first non-folding area NFA1 and the second non-folding area NFA2 may face each other. Accordingly, in a state where the display device DD2 is fully folded, the display area DA may not be exposed to the outside, which may be referred to as "in-folding". This is only one of embodiments, and the operation of the display device DD2 is not limited thereto.

In an embodiment, in an embodiment of the disclosure, when the display device DD2 is folded, the first non-folding area NFA1 and the second non-folding area NFA2 may be opposite to each other, for example. Accordingly, the first non-folding area NFA1 may be exposed to the outside in the folding state, which may be referred to as "out-folding".

Only one of the in-folding or the out-folding of the display device DD2 may be possible. In an alternative embodiment, both the in-folding and the out-folding of the display device DD2 may be possible. In this case, the same area of the display device DD2, e.g., the folding area FA may be in-folded or out-folded. In an alternative embodiment, a partial area of the display device DD2 may be in-folded, and the remaining area thereof may be out-folded.

One folding area and two non-folding areas are illustrated in FIGS. 2A and 2B, but the number of folding areas and the number of non-folding areas are not limited thereto. In an embodiment, the display device DD2 may include a plurality of non-folding areas, the number of which is more than two, and a plurality of folding areas; each of the plurality of folding areas may be interposed between non-folding areas adjacent to each other from among the plurality of non-folding areas, for example.

An embodiment in which the folding axis FX is parallel to the minor axis of the display device DD2 is illustrated in FIGS. 2A and 2B. However, the disclosure is not limited thereto. In an embodiment, the folding axis FX may extend in a direction parallel to the major axis of the display device DD2, e.g., the second direction DR2. In this case, the first non-folding area NFA1, the folding area FA, and the second non-folding area NFA2 may be sequentially arranged in the first direction DR1, for example.

The plurality of display areas DA1 and DA2 may be defined in the display area DA of the display device DD2. Two display areas DA1 and DA2 are illustrated in an embodiment of FIG. 2A, but the number of display areas defined in the display area DA is not limited thereto.

The plurality of display areas DA1 and DA2 may include the first display area DA1 and the second display area DA2. In an embodiment, the first display area DA1 may be an area where the first image IM1 is displayed, and the second display area DA2 may be an area in which the second image IM2 is displayed, for example. In an embodiment, the first image IM1 may be a video, and the second image IM2 may be a still image or an image (e.g., text information) having a long change period, for example.

The sizes of the first display area DA1 and the second display area DA2 may be determined in advance and may be changed by an application program. In an embodiment, the first display area DA may correspond to the first non-folding area NFA1, and the second display area DA2 may correspond to the second non-folding area NFA2. Also, a first portion of the folding area FA may correspond to the first display area DA1, and a second portion of the folding area FA may correspond to the second display area DA2.

In an embodiment, the whole folding area FA may correspond to only one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. That is, the size of the second display area DA2 may be larger than the size of the first display area DA1.

In an embodiment, the first display area DA1 may correspond to the first non-folding area NFA1, the folding area FA, and the first portion of the second non-folding area NFA2, and the second display area DA2 may correspond to the second portion of the second non-folding area NFA2. That is, the size of the first display area DA1 may be larger than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

An embodiment in which the display device DD2 has one folding area is illustrated in FIGS. 2A and 2B in an embodiment of a display device. However, the disclosure is not limited thereto. In an embodiment, the disclosure may also be applied to a display device having two or more folding areas, a rollable display device, or a slidable display device, for example.

Below, the display device DD illustrated in FIG. 1 will be described as an embodiment. However, the display device DD illustrated in FIG. 1 may be identically applied to the display device DD2 illustrated in FIGS. 2A and 2B.

Figure 3A:
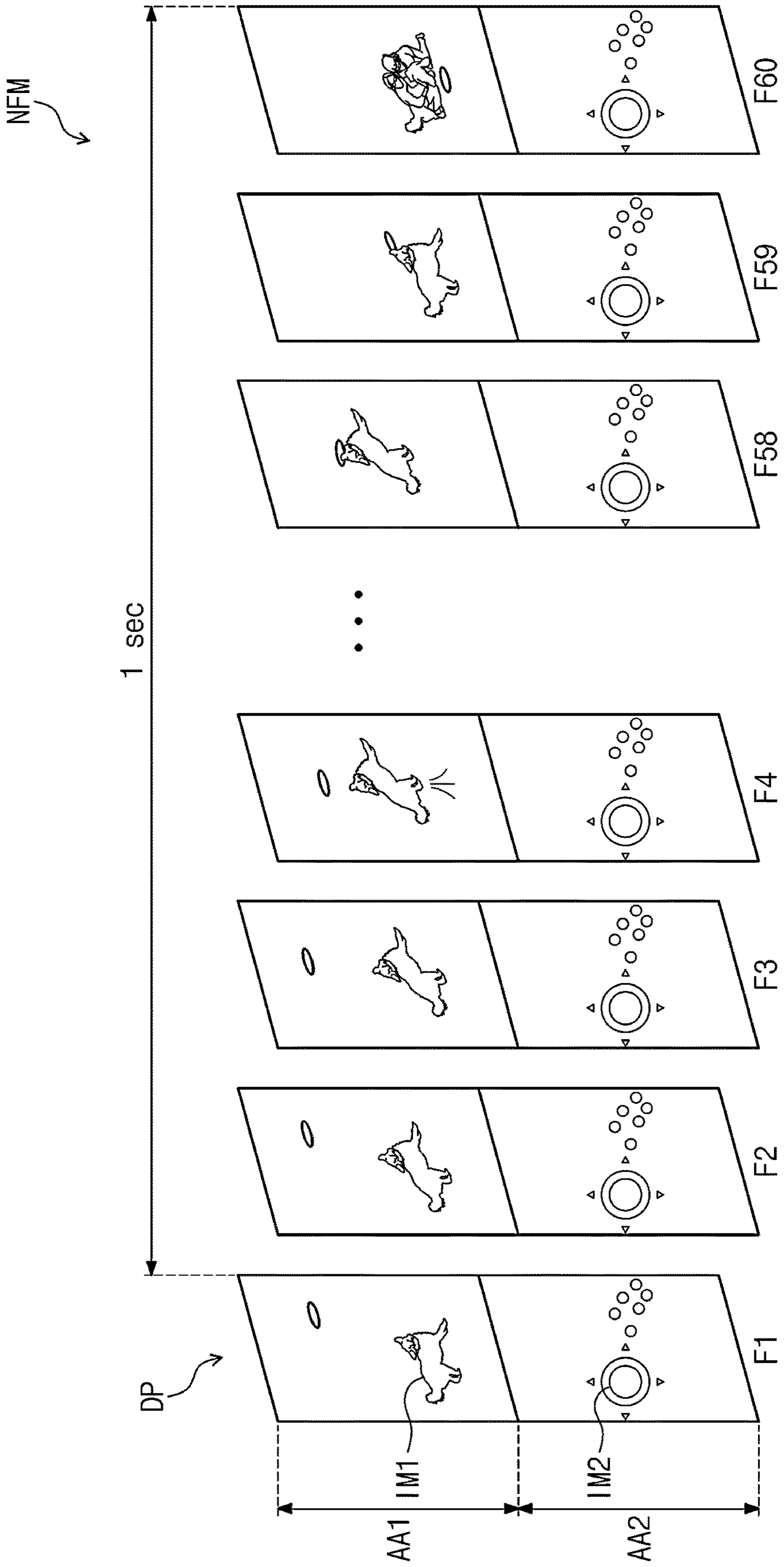
FIG. 3A is a diagram for describing an operation of a display panel in a normal mode.
Figure 3B:
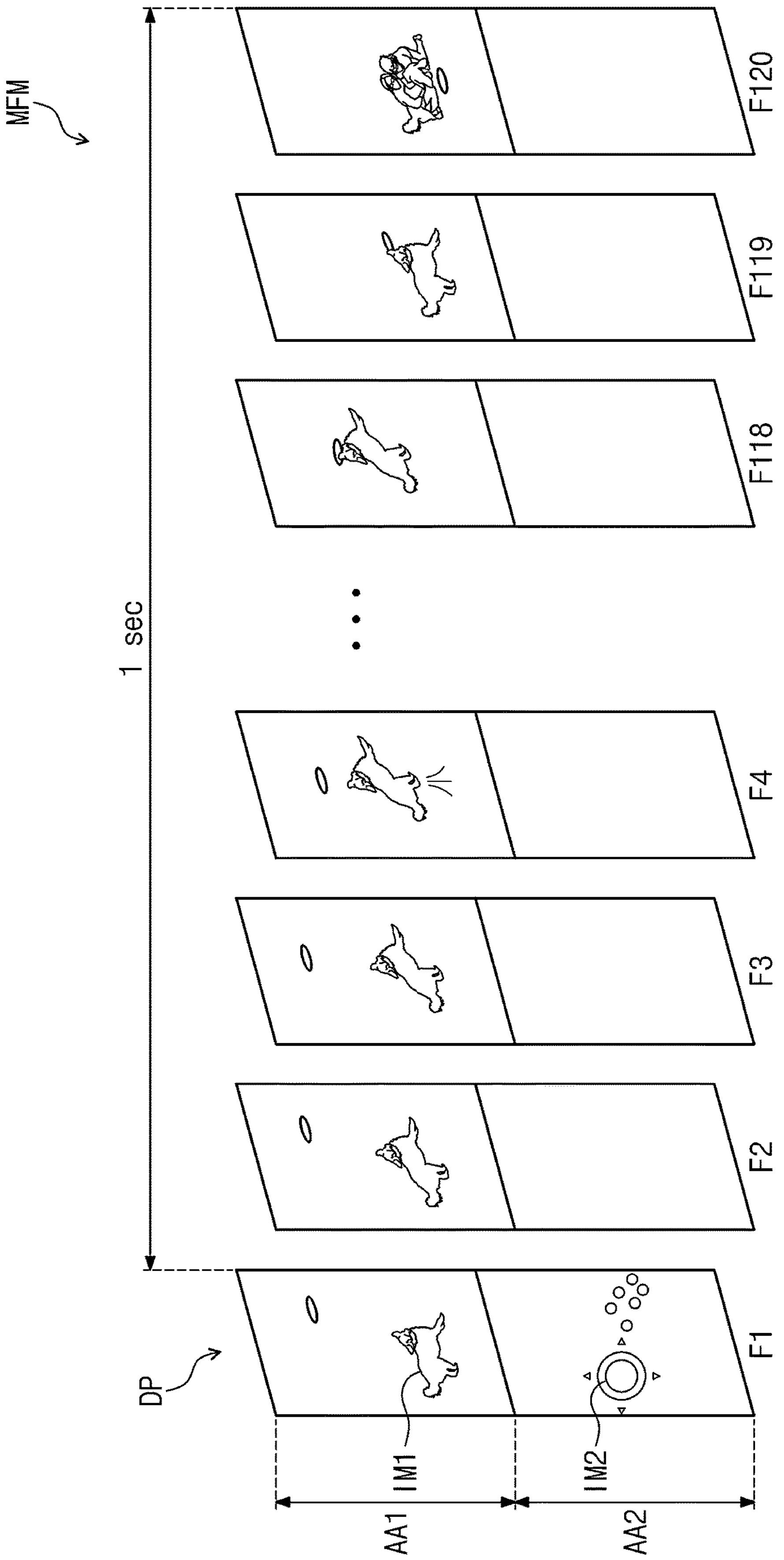
FIG. 3B is a diagram for describing an operation of a display panel in a multi-frequency mode.

FIG. 3A is a diagrams for describing an operation of a display panel in a normal mode, and FIG. 3B is a diagrams for describing an operation of a display panel in a multi-frequency mode.

Referring to FIG. 3A, the display device DD (refer to FIG. 1) may include a display panel DP. The display panel DP in an embodiment of the disclosure may be a light-emitting display panel but is not particularly limited thereto. In an embodiment, the display panel DP may be an organic light-emitting display panel, a quantum dot display panel, a micro-light-emitting diode ("micro-LED") display panel, or a nano-LED display panel, for example. An emission layer of the organic light-emitting display panel may include an organic light-emitting material. An emission layer of the quantum dot display panel may include a quantum dot, a quantum rod, etc. An emission layer of the micro-LED display panel may include a micro-LED. An emission layer of the nano-LED display panel may include a nano-LED.

The display panel DP may include a first display area AA1 and the second display area AA2. In a plan view, the first display area AA1 may overlap the first display area DA1 (refer to FIG. 1) of the display device DD (refer to FIG. 1). The second display area AA2 may overlap the second display area DA2 (refer to FIG. 1) of the display device DD (refer to FIG. 1).

The display panel DP in an embodiment may operate differently depending on an operating mode. The operating mode may include a normal mode NFM and a multi-frequency mode MFM. In the normal mode NFM, the display panel DP may drive the first display area AA1 and the second display area AA2 at a normal frequency. The normal frequency may be also referred to as a "first driving frequency". In an embodiment, in the multi-frequency mode MFM, the display panel DP may drive the first display area AA1, in which the first image IM1 is displayed, at the first driving frequency and may drive the second display area AA2, in which the second image IM2 is displayed, at a second driving frequency lower than the first driving frequency. In an embodiment, the first driving frequency may be the same frequency as the normal frequency.

Referring to FIG. 3A, the first image IM1 that is displayed in the first display area AA1 may be a video, and the second image IM2 that is displayed in the second display area AA2 may be a still image or an image (e.g., a game control keypad) having a long change period.

In the normal mode NFM, the operating frequencies of the first display area AA1 and the second display area AA2 of the display panel DP are the normal frequency. In an embodiment, the normal frequency may be 60 Hertz (Hz). In the normal mode NFM, for one second, images of the first frame F1 to the 60th frame F60 may be displayed in the first display area AA1 and the second display area AA2 of the display panel DP, for example. However, this is an illustrative embodiment, and the normal frequency in an embodiment of the disclosure may have various frequencies. In an embodiment, the normal frequency may be 120 Hz, for example.

Referring to FIG. 3B, in the multi-frequency mode MFM, the display panel DP may set the driving frequency of the first display area AA1, in which the first image IM1, that is, a video is displayed, to the first driving frequency and may set the driving frequency of the second display area AA2, in which the second image IM2, that is, a still image is displayed, to a second driving frequency lower than the first driving frequency. When the normal frequency is 120 Hz, the first driving frequency may be 120 Hz, and the second driving frequency may be 1 Hz. The first driving frequency and the second driving frequency may be variously changed. In an embodiment, the first driving frequency may be 144 Hz higher than the normal frequency or may be the same frequency as the normal frequency, that is, 60 Hz, for example. In an embodiment, the second driving frequency may be one of 30 Hz, 10 Hz, and 1 Hz lower than the normal frequency, for example.

In the multi-frequency mode MFM, when the first driving frequency is 120 Hz and the second driving frequency is 1 Hz, the first image IM1 corresponding to each of the first to 120th frames F1 to F120 may be displayed in the first display area AA1 of the display panel DP for one second. The second image IM2 corresponding to only the first frame F1 may be displayed in the second display area AA2, and an image corresponding to each of the remaining frames F2 to F120 may not be displayed in the second display area AA2.

According to the disclosure, the display panel DP may drive the first display area AA1, in which a video is displayed, at a first operating frequency and may drive the second display area AA2, in which a still image is displayed, at a frequency lower than the first operating frequency. The display panel DP may reduce power consumption by decreasing the driving frequency of the second display area AA2. According to the above description, the display device DD (refer to FIG. 1) whose reliability is improved may be provided.

Figure 4:
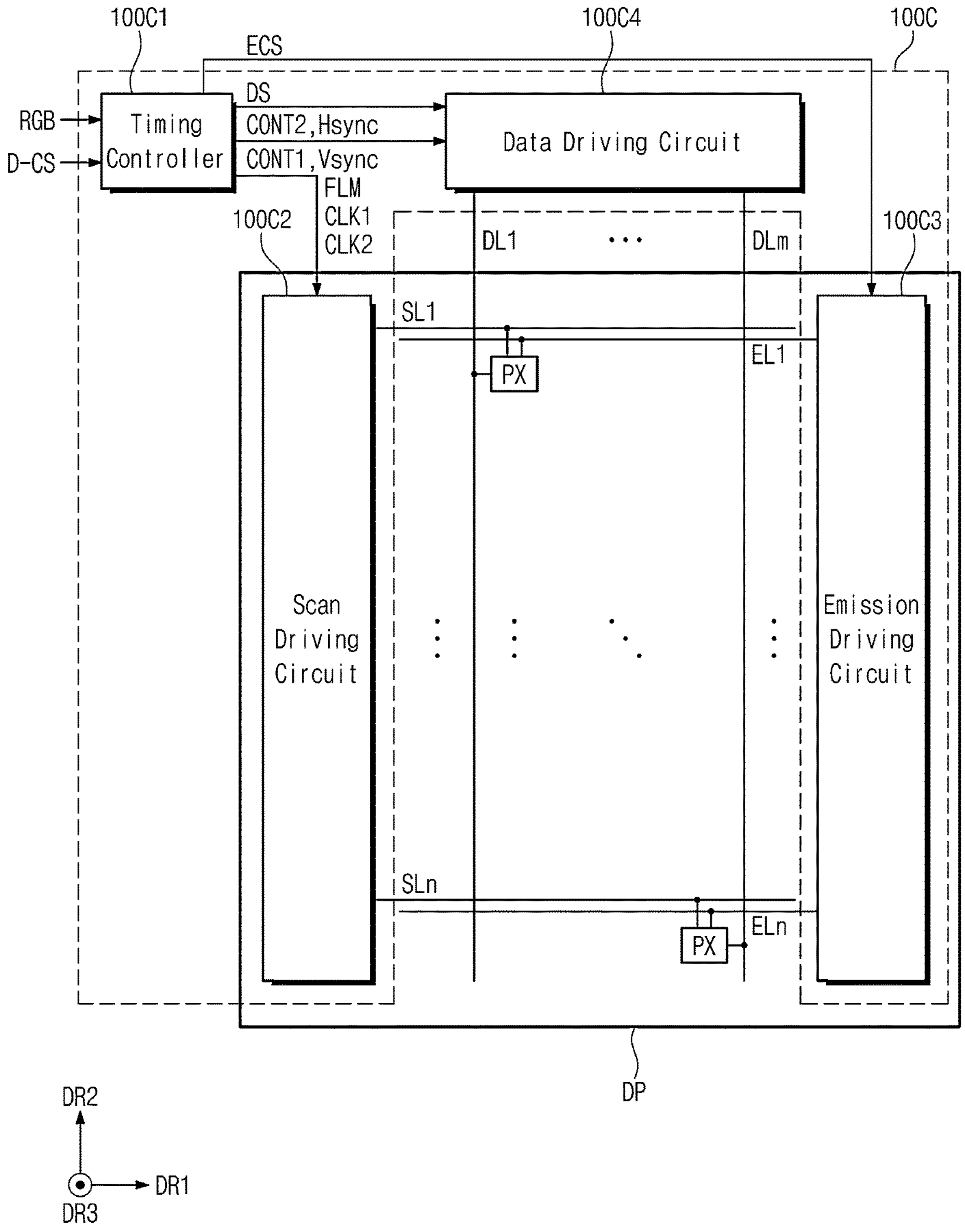
FIG. 4 is a block diagram of an embodiment of a display panel and a display driving unit according to the disclosure.

FIG. 4 is a block diagram of an embodiment of a display panel and a display driving unit according to the disclosure.

Referring to FIG. 4, the display panel DP may include a plurality of scan lines SL1 to SLn, a plurality of emission control lines EL1 to ELn, a plurality of data lines DL1 to DLm, and a plurality of pixels PX. Here, each of n and m may be a natural number. Each of the plurality of scan lines SL1 to SLn may extend in the first direction DR1. The plurality of scan lines SL1 to SLn may be arranged to be spaced from each other in the second direction DR2. Each of the plurality of data lines DL1 to DLm may extend in the second direction DR2, and the plurality of data lines DL1 to DLm may be arranged to be spaced from each other in the first direction DR1.

A display panel driving circuit 100C may include a timing controller 100C1, a scan driving circuit 100C2, an emission driving circuit 100C3, and a data driving circuit 100C4.

The timing controller 100C1 may receive image data RGB and a control signal D-CS. The control signal D-CS may include various signals. In an embodiment, the control signal D-CS may include an input vertical synchronization signal, an input horizontal synchronization signal, a plurality of clock signals, a data enable signal, etc., for example.

The timing controller 100C1 may generate a first control signal CONT1 and a vertical synchronization signal Vsync based on the control signal D-CS and may output the first control signal CONT1 and the vertical synchronization signal Vsync to the scan driving circuit 100C2. The vertical synchronization signal Vsync may be included in the first control signal CONT1.

In the multi-frequency mode MFM (refer to FIG. 3B), the timing controller 100C1 may divide the display panel DP into the first display area AA1 (refer to FIG. 3B) and the second display area AA2 (refer to FIG. 3B). The timing controller 100C1 may control the scan driving circuit 100C2 such that the first display area AA1 (refer to FIG. 3B) and the second display area AA2 (refer to FIG. 3B) operate at different frequencies.

The timing controller 100C1 may generate a second control signal CONT2 and a horizontal synchronization signal Hsync based on the control signal D-CS and may output the second control signal CONT2 and the horizontal synchronization signal Hsync to the data driving circuit 100C4. The horizontal synchronization signal Hsync may be included in the second control signal CONT2.

Also, the timing controller 100C1 may provide the data driving circuit 100C4 with a driving signal DS that is obtained by processing the image data RGB so as to be appropriate for an operation condition of the display panel DP. The first control signal CONT1 and the second control signal CONT2 that are signals desired for the operations of the scan driving circuit 100C2 and the data driving circuit 100C4 are not particularly limited.

The timing controller 100C1 may generate a third control signal ECS based on the control signal D-CS and may output the third control signal ECS to the emission driving circuit 100C3.

The scan driving circuit 100C2 drives the plurality of scan lines SL1 to SLn in response to the first control signal CONT1 and the vertical synchronization signal Vsync. In an embodiment of the disclosure, the scan driving circuit 100C2 may be formed in the same process as a circuit layer in the display panel DP, but is not limited thereto. In an embodiment, the scan driving circuit 100C2 may be implemented with an integrated circuit ("IC"); for electrical connection with the display panel DP, the integrated circuit may be directly disposed (e.g., mounted) in a given area of the display panel DP or may be disposed (e.g., mounted) on a separate printed circuit board in a chip on film ("COF") method, for example.

The scan driving circuit 100C2 may receive a start signal FLM, a first clock signal CLK1, and a second clock signal CLK2 from the timing controller 100C1. An embodiment in which the scan driving circuit 100C2 receives two clock signals CLK1 and CLK2 is illustrated in FIG. 4, but the number of clock signals that the scan driving circuit 100C2 receives from the timing controller 100C1 is not limited thereto. In an embodiment, the scan driving circuit 100C2 may receive first to fourth clock signals CLK1-1, CLK2-1, CLK3-1, and CLK4-1 (refer to FIG. 10) from the timing controller 100C1, for example.

The emission driving circuit 100C3 receives the third control signal ECS from the timing controller 100C1. The emission driving circuit 100C3 may output emission control signals to the emission control lines EL1 to ELn in response to the third control signal ECS.

The data driving circuit 100C4 may output grayscale voltages to the plurality of data lines DL1 to DLm in response to the second control signal CONT2, the horizontal synchronization signal Hsync, and the driving signal DS from the timing controller 100C1. The data driving circuit 100C4 may be implemented with an integrated circuit; for electrical connection with the display panel DP, the integrated circuit may be directly disposed (e.g., mounted) in a given area of the display panel DP or may be disposed (e.g., mounted) on a separate printed circuit board in the chip-on-film method. However, the disclosure is not limited thereto. In an embodiment, the data driving circuit 100C4 may be formed in the same process as the circuit layer in the display panel DP, for example.

Figure 5:
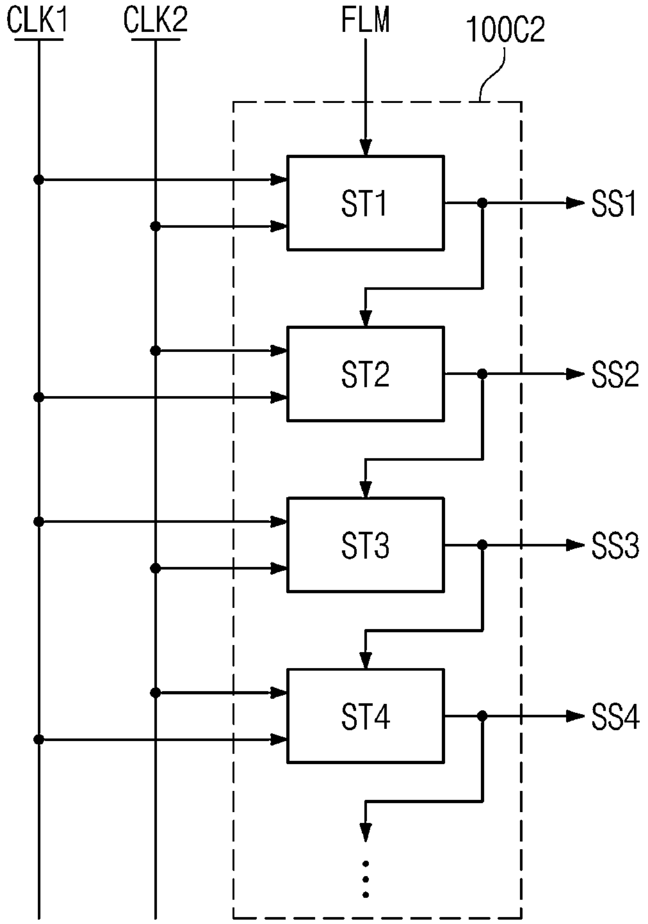
FIG. 5 is a block diagram illustrating an embodiment of a scan driving circuit according to the disclosure.
Figure 6:
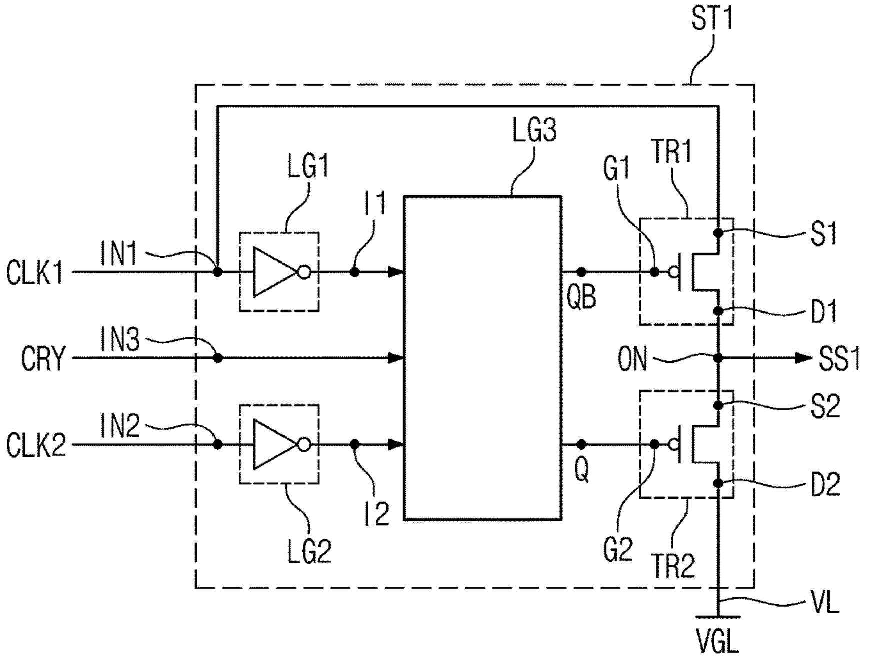
FIG. 6 is a block diagram illustrating an embodiment of a scan stage according to the disclosure.

FIG. 5 is a block illustrating an embodiment of a scan driving circuit according to the disclosure, and FIG. 6 is a block diagram illustrating an embodiment of a scan stage according to the disclosure.

A first scan stage ST1 is illustrated in an embodiment of FIG. 6, but the remaining scan stages ST2 to ST4 may have the same configuration as the first scan stage ST1.

Referring to FIGS. 5 and 6, the scan driving circuit 100C2 may include the plurality of scan stages ST1, ST2, ST3, and ST4. Each of the plurality of scan stages ST1 to ST4 may receive the first clock signal CLK1, the second clock signal CLK2, and a carry signal CRY, and the plurality of scan stages ST1 to ST4 may respectively output scan signals SS1, SS2, SS3, and SS4.

The plurality of scan stages ST1 to ST4 may include the first scan stage ST1, the second scan stage ST2, the third scan stage ST3, and the fourth scan stage ST4 arranged in order. Four scan stages are illustrated in an embodiment of FIG. 5, but the number of scan stages in an embodiment of the disclosure is not limited thereto.

The plurality of scan stages ST1 to ST4 may respectively correspond to the plurality of scan lines SL1 to SLn (refer to FIG. 4) and may be respectively connected thereto. In an embodiment, the first scan stage ST1 may be connected to the first scan line SL1, for example.

The first scan stage ST1 among the plurality of scan stages ST1 to ST4 may receive the start signal FLM as the carry signal CRY from the timing controller 100C1 (refer to FIG. 4).

The remaining scan stages ST2, ST3, and ST4 of the plurality of scan stages ST1 to ST4 may receive, as the carry signal CRY, the scan signals SS1, SS2, and SS3 respectively output from previous scan stages. In an embodiment, the second scan stage ST2 may receive the scan signal SS1 output from the first scan stage ST1 as the carry signal CRY, for example. The third scan stage ST3 may receive the scan signal SS2 output from the second scan stage ST2 as the carry signal CRY. The fourth scan stage ST4 may receive the scan signal SS3 output from the third scan stage ST3 as the carry signal CRY.

A phase shift may be made in order of the first clock signal CLK1 and the second clock signal CLK2. In the first clock signal CLK1, a first voltage and a second voltage may be repeated at a given period. The first voltage may be higher in level than the second voltage. The first voltage may be a high-level voltage VGH (refer to FIG. 8). The second voltage may be a low-level voltage VGL. In this case, the first voltage and the high-level voltage VGH (refer to FIG. 8) may be expressed by “1”, and the second voltage and the low-level voltage VGL may be expressed by “0”. The first clock signal CLK1 and the second clock signal CLK2 may be a normally low signal.

In each of the plurality of scan stages ST1 to ST4, a first input node IN1, a second input node IN2, a third input node IN3, and an output node ON may be defined.

The first scan stage ST1 may include a first circuit LG1, a second circuit LG2, a third circuit LG3, a pull-up transistor TR1, and a pull-down transistor TR2.

The first circuit LG1 may be connected to the first input node IN1 of receiving one of the first clock signal CLK1 and the second clock signal CLK2. In an embodiment, the first circuit LG1 may receive the first clock signal CLK1, for example. The first circuit LG1 may include a NOT gate. In an embodiment, when “0” is input to the first circuit LG1, “1” may be output; when “1” is input to the first circuit LG1, “0” may be output, for example.

The second circuit LG2 may be connected to the second input node IN2 of receiving the other of the first clock signal CLK1 and the second clock signal CLK2. In an embodiment, the second circuit LG2 may receive the second clock signal CLK2, for example. The second circuit LG2 may include a NOT gate. In an embodiment, when “1” is input to the second circuit LG2, “0” may be output; when “0” is input to the second circuit LG2, “1” may be output, for example.

The third circuit LG3 may be connected to the third input node IN3 of receiving the carry signal CRY. The third circuit LG3 may be connected to the first circuit LG1 and the second circuit LG2. The third circuit LG3 may be connected to a first control node QB corresponding to a first gate node G1 of the pull-up transistor TR1 and a second control node Q corresponding to a second gate node G2 of the pull-down transistor TR2.

The third circuit LG3 that is a circuit controlling voltages of the first control node QB and the second control node Q may include a plurality of transistors. The third circuit LG3 may include a latch and/or a flip-flop.

The first control node QB may be electrically connected to the first gate node G1 of the pull-up transistor TR1 and may be repeatedly charged and discharged by the third circuit LG3. The second control node Q may be electrically connected to the second gate node G2 of the pull-down transistor TR2 and may be repeatedly charged and discharged by the third circuit LG3.

The pull-up transistor TR1 may be electrically connected between the first input node IN1 and the output node ON and may be turned on/off by the first control node QB. The pull-up transistor TR1 may include a first source node S1 connected to the first input node IN1, a first drain node D1 connected to the output node ON, and the first gate node G1 connected to the first control node QB.

The pull-up transistor TR1 is a transistor that supplies the scan signal SS1 corresponding to the first clock signal CLK1 to the first scan line SL1 (refer to FIG. 4) through the output node ON. The pull-up transistor TR1 may be a p-channel metal-oxide-semiconductor (“PMOS”) transistor.

The pull-down transistor TR2 may be electrically connected between the output node ON and a low-level voltage line VL to which the low-level voltage VGL is provided and may be turned on/off by the second control node Q. The pull-down transistor TR2 may include a second source node S2 connected to the output node ON, a second drain node D2 connected to the low-level voltage line VL, and the second gate node G2 connected to the second control node Q. The pull-down transistor TR2 may be a PMOS transistor.

The pull-down transistor TR2 is a transistor that supplies the scan signal SS1 corresponding to the low-level voltage VGL to the first scan line SL1 (refer to FIG. 4) through the output node ON.

The pull-up transistor TR1 and the pull-down transistor TR2 may be turned on at different timings from each other.

TABLE 1

| IN1 | IN2 | I1 | I2 | QB | Q | ON |
|---|---|---|---|---|---|---|
| 1 | 0 | 0 | 1 | 0 | 1 | 1 |
| 0 | 1 | 1 | 0 | 0 | 1 | 0 |
| 1 | 0 | 0 | 1 | 1 | 0 | 0 |
| 0 | 1 | 1 | 0 | 1 | 0 | 0 |

Table 1 is a truth table of input and output signals of the first scan stage ST1 according to the disclosure. When the first clock signal CLK1 input to the first scan stage ST1 is “0”, as the scan signal SS1, “0” may be output through the output node ON.

The first scan stage ST1 is described with reference to FIG. 6 in an embodiment, but the description given with reference to FIG. 6 may be identically applied to the second to fourth scan stages ST2 to ST4 according to the disclosure.

As illustrated in FIG. 5, in each of the odd-numbered scan stages ST1 and ST3, the first clock signal CLK1 may be provided to the first input node IN1, and the second clock signal CLK2 may be provided to the second input node IN2. In each of the even-numbered scan stages ST2 and ST4, the second clock signal CLK2 may be provided to the first input node IN1, and the first clock signal CLK1 may be provided to the second input node IN2.

Figure 7:
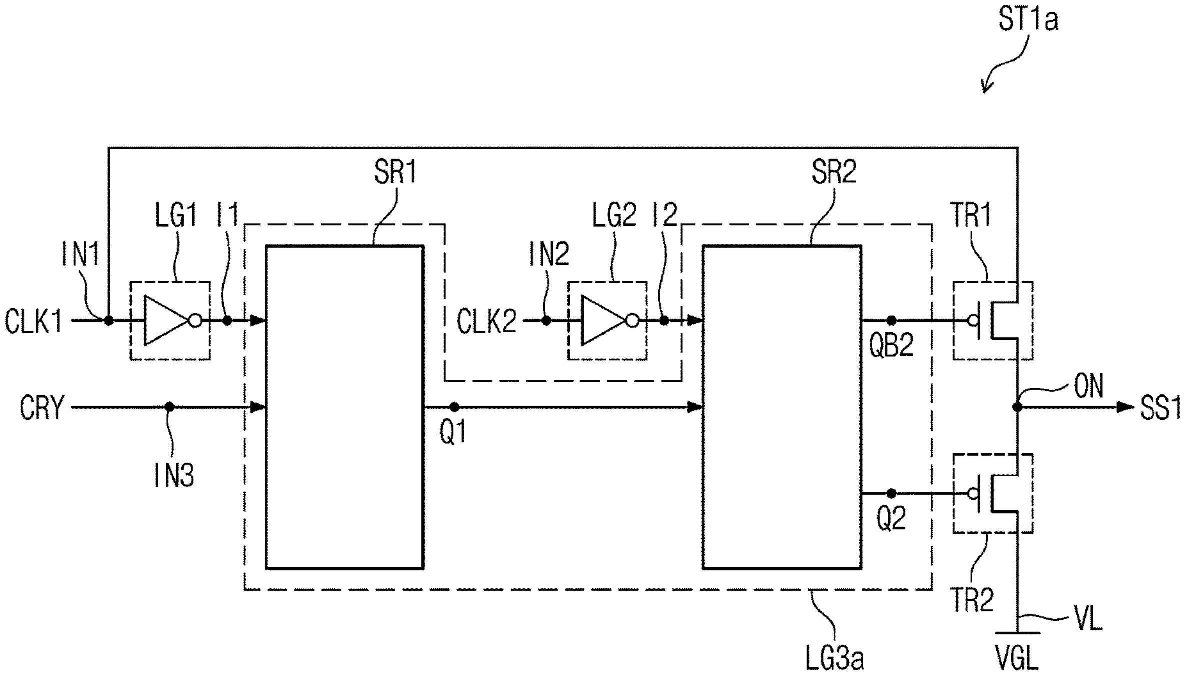
FIG. 7 is a block diagram illustrating an embodiment of a first scan stage according to the disclosure.

FIG. 7 is a block diagram illustrating an embodiment of a first scan stage according to the disclosure. In the description of FIG. 7, the components that are described with reference to FIG. 6 are marked by the same reference numerals/signs.

Referring to FIG. 7, a first scan stage ST1*a* may include the first circuit LG1, the second circuit LG2, a third circuit LG3*a*, the pull-up transistor TR1, and the pull-down transistor TR2.

The third circuit LG3*a* may include a first shift register SR1 and a second shift register SR2.

The first shift register SR1 may receive the carry signal CRY through the third input node IN3. The first shift register SR1 may be connected to the first input node IN1. The first shift register SR1 may be connected to an intermediate node Q1. The first shift register SR1 may include a flip-flop.

The second shift register SR2 may receive a signal output from the first shift register SR1 through the intermediate node Q1. The second shift register SR2 may be connected to the second input node IN2, a first control node QB2, and a second control node Q2. The second shift register SR2 may include a flip-flop.

Figure 8:
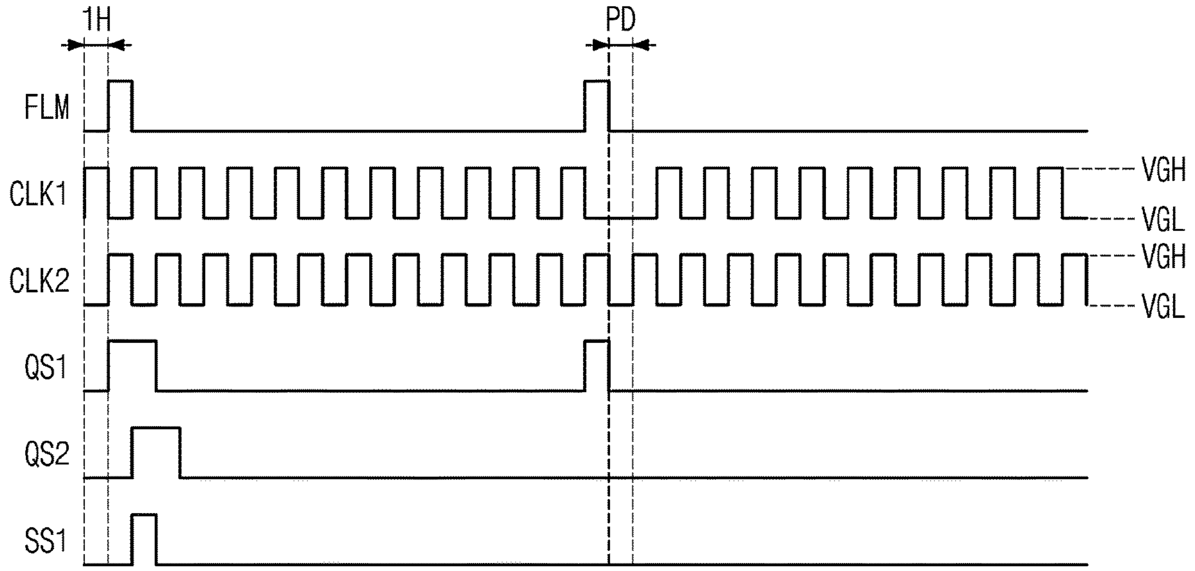
FIG. 8 is a waveform diagram illustrating an embodiment of a driving operation of a scan stage according to the disclosure.

FIG. 8 is a waveform diagram illustrating an embodiment of a driving operation of a scan stage according to the disclosure.

Referring to FIGS. 7 and 8, in the first clock signal CLK1, the first voltage and the second voltage may be repeated at a given period. The given period may be one horizontal period 1H. The first voltage may be higher in level than the second voltage. The first voltage may be the high-level voltage VGH. The second voltage may be the low-level voltage VGL. In this case, the first voltage and the high-level voltage VGH may be expressed by "1", and the second voltage and the low-level voltage VGL may be expressed by "0".

The phase of the second clock signal CLK2 may be opposite to the phase of the first clock signal CLK1.

Each of the carry signal CRY, a first signal QS1 of the intermediate node Q1, a second signal QS2 of the second control node Q2, and the scan signal SS1 may have the first voltage or the second voltage. As not illustrated in FIG. 8, the phase of the signal of the first control node QB2 may be opposite to the phase of the second signal QS2.

That is, the carry signal CRY, the first signal QS1, the second signal QS2, and the scan signal SS1 may be signals of a normally low type.

The carry signal CRY may be a signal indicating the start of the operation of the first scan stage ST1*a*. The first scan stage ST1*a* may receive the start signal FLM as the carry signal CRY from the timing controller 100C1 (refer to FIG. 4).

When the start signal FLM of the high-level voltage VGH is provided to the first scan stage ST1*a*, the first scan stage ST1*a* may output the first signal QS1 having the high-level voltage VGH. In this case, the start signal FLM may be output from the timing controller 100C1 (refer to FIG. 4) and may be provided to the first scan stage ST1*a* as the carry signal CRY.

The second shift register SR2 may output the second signal QS2 having the high-level voltage VGH to the second control node Q2 after a delay corresponding to one horizontal period 1H. A signal having the low-level voltage VGL may be output to the first control node QB2. In this case, the first scan signal SS1 having the high-level voltage VGH may be output to the output node ON. That is, "1" may be input to the first input node IN1, "0" may be input to the second input node IN2, "0" may be output to the first control node QB2, and "1" may be output to the second control node Q2. This may correspond to the first case of Table 1, and "1" may be output to the output node ON.

The first scan signal SS1 may be provided to the first scan line SL1 (refer to FIG. 4). Also, the first scan signal SS1 may be provided to the second scan stage ST2 (refer to FIG. 5) as the carry signal CRY such that a plurality of scan stages sequentially operate.

Afterwards, when the start signal FLM of the high-level voltage VGH is provided to the first scan stage ST1*a*, the first scan stage ST1*a* may output the first signal QS1 having the high-level voltage VGH.

In the multi-frequency mode MFM (refer to FIG. 3B), the timing controller 100C1 (refer to FIG. 4) may mask a partial period PD of the first clock signal CLK1 provided to a scan stage, which is connected to the second display area AA2 (refer to FIG. 3B), from among the plurality of scan stages ST1 to ST4 (refer to FIG. 5). An embodiment in which a partial period of the first clock signal CLK1 provided to the first scan stage ST1*a* is masked is illustrated in FIG. 8. The partial period PD may be also referred to as a "masking period PD".

In the masking period PD, the first clock signal CLK1 may be masked. When the first clock signal CLK1 is masked, the first clock signal CLK1 may have the second voltage. That is, the masked first clock signal CLK1 may have the low-level voltage VGL.

When the first shift register SR1 receives the first clock signal CLK1 having the low-level voltage VGL, the first shift register SR1 may output the first signal QS1 having the low-level voltage VGL.

In response to the first signal QS1 having the low-level voltage VGL, the second shift register SR2 may output the second signal QS2 having the low-level voltage VGL. In this case, the first scan signal SS1 having the low-level voltage VGL may be output to the output node ON. That is, the first scan signal SS1 may not be output to the first scan line SL1 (refer to FIG. 4) by the masked first clock signal CLK1. That is, as "0" is input to the first input node IN1, "0" may be output to the second control node Q2; in this case, "0" may be output to the output node ON.

The display panel DP (refer to FIG. 3B) may set the driving frequency of the first display area AA1 (refer to FIG. 3B), in which the first image IM1, that is, a video is displayed, to the first driving frequency and may set the driving frequency of the second display area AA2 (refer to FIG. 3B), in which the second image IM2, that is, a still image is displayed, to the second driving frequency. In the multi-frequency mode MFM (refer to FIG. 3B), when the second driving frequency is 1 Hz, the second image IM2 (refer to FIG. 3B) may be displayed in the second display area AA2 (refer to FIG. 3B) only at the first frame F1 (refer to FIG. 3B), and an image may not be displayed in the second display area AA2 (refer to FIG. 3B) at the remaining frames F2 to F120 (refer to FIG. 3B).

According to the disclosure, there may be provided the display device DD (refer to FIG. 1) that operates in the multi-frequency mode MFM (refer to FIG. 3B) through a plurality of circuits without any other additional element and any other signal line except for a scan stage. The increase in the size of the scan stage may be minimized by connecting the first clock signal CLK1 to the first source node S1 of the pull-up transistor TR1 and allowing the third circuit LG3 to receive the first clock signal CLK1 and the second clock signal CLK2 through the first circuit LG1 and the second circuit LG2, respectively. Accordingly, the display panel driving circuit 100C (refer to FIG. 4) in which the area of the non-display area NDA (refer to FIG. 1) is reduced and the display device DD (refer to FIG. 1) including the same may be provided.

Figure 9:
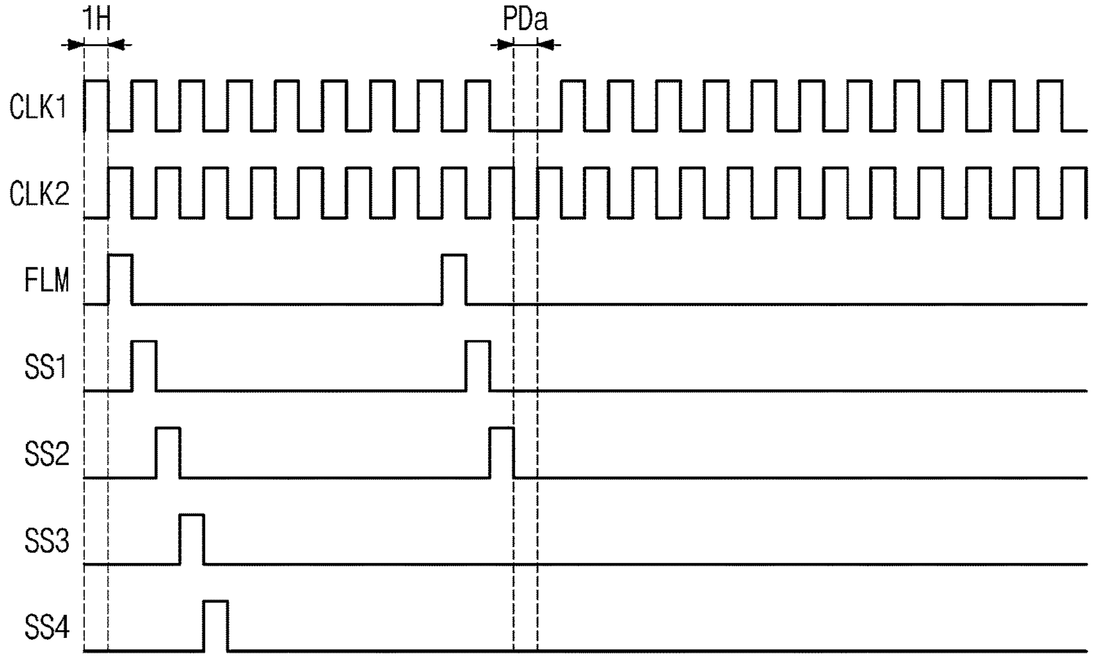
FIG. 9 is a waveform diagram illustrating an embodiment of a driving operation of a plurality of scan stages according to the disclosure.

FIG. 9 is a waveform diagram illustrating an embodiment of a driving operation of a plurality of scan stages according to the disclosure. In the description of FIG. 9, the components that are described with reference to FIG. 8 are marked by the same reference numerals/signs, and thus, additional description will be omitted to avoid redundancy.

Referring to FIGS. 5, 6, and 9, when the start signal FLM of the high-level voltage VGH is provided to the first scan stage ST1, the first scan stage ST1 may output the first scan signal SS1 having the high-level voltage VGH to the output node ON after a delay corresponding to one horizontal period 1H. In this case, the start signal FLM that is output from the timing controller 100C1 (refer to FIG. 4) may be provided to the first scan stage ST1 as the carry signal CRY.

The second scan stage ST2 may receive the first scan signal SS1 as the carry signal CRY. The second scan stage ST2 may output the second scan signal SS2 having the high-level voltage VGH to the output node ON after a delay corresponding to one horizontal period 1H.

The third scan stage ST3 may receive the second scan signal SS2 as the carry signal CRY. The third scan stage ST3 may output the third scan signal SS3 having the high-level voltage VGH to the output node ON after a delay corresponding to one horizontal period 1H.

The fourth scan stage ST4 may receive the third scan signal SS3 as the carry signal CRY. The fourth scan stage ST4 may output the fourth scan signal SS4 having the high-level voltage VGH to the output node ON after a delay corresponding to one horizontal period 1H.

The scan driving circuit 100C2 may include the plurality of scan stages ST1 to ST4. The scan driving circuit 100C2 may sequentially supply the plurality of scan signals SS1 to SS4 to the plurality of scan lines SL1 to SLn (refer to FIG. 4), respectively. The scan driving circuit 100C2 may sequentially drive the plurality of scan lines SL1 to SLn (refer to FIG. 4). When a predetermined scan line is driven by the scan driving circuit 100C2, the data driving circuit 100C4 (refer to FIG. 4) may output grayscale voltages to the plurality of data lines DL1 to DLm (refer to FIG. 4). As such, the display device DD (refer to FIG. 1) may display the images IM1 and IM2 (refer to FIG. 1) in the display area DA (refer to FIG. 1).

Afterwards, when the start signal FLM of the high-level voltage VGH is provided to the first scan stage ST1, the first scan stage ST1*a* may output the first scan signal SS1 having the high-level voltage VGH.

The second scan stage ST2 may receive the first scan signal SS1 as the carry signal CRY. The second scan stage ST2 may output the second scan signal SS2 having the high-level voltage VGH to the output node ON after a delay corresponding to one horizontal period 1H.

In the multi-frequency mode MFM (refer to FIG. 3B), the timing controller 100C1 (refer to FIG. 4) may mask a partial period PDa of the first clock signal CLK1 provided to a scan stage, which is connected to the second display area AA2 (refer to FIG. 3B), from among the plurality of scan stages ST1 to ST4. An embodiment in which a partial period of the first clock signal CLK1 provided to the third scan stage ST3 is masked is illustrated in FIG. 9. The partial period PDa may be also referred to as a "masking period PDa". An embodiment of a configuration where the third scan stage ST3 is connected to the second display area AA2 (refer to FIG. 3B) is illustrated in FIG. 9, but the disclosure is not limited thereto.

In the masking period PDa, the first clock signal CLK1 may be masked. When the first clock signal CLK1 is masked, the first clock signal CLK1 may have the second voltage. That is, the masked first clock signal CLK1 may have the low-level voltage VGL.

The third scan stage ST3 may receive the second scan signal SS2 as the carry signal CRY and may receive the first clock signal CLK1 having the low-level voltage VGL through the first input node IN1. In this case, the third scan signal SS3 having the low-level voltage VGL may be output to the output node ON. That is, the third scan stage ST3 may not output the third scan signal SS3 having the active level due to the masked first clock signal CLK1.

That is, when "0" is input to the first input node IN1, "0" may be output to the output node ON.

As the third scan signal SS3 having the low-level voltage VGL is provided, the fourth scan stage ST4 may not operate. That is, scan stages following the third scan stage ST3 may not operate due to the masking period PDa.

When the first clock signal CLK1 is masked, the plurality of scan stages ST1 to ST4 may respectively output the scan signals SS1 to SS4 having the second voltage.

According to the disclosure, in the multi-frequency mode MFM (refer to FIG. 3B), when the second driving frequency is 1 Hz, the second image IM2 (refer to FIG. 3B) may be displayed in the second display area DA2 (refer to FIGS. 1, 2A and 2B) only at the first frame F1 (refer to FIG. 3B); because the first clock signal CLK1 is masked, an image may not be displayed at the first frame F2 among the remaining frames F2 to F120 (refer to FIG. 3B). Accordingly, the display device DD (refer to FIG. 1) in which power consumption is reduced may be provided.

Also, according to the disclosure, there may be provided the display device DD (refer to FIG. 1) that operates in the multi-frequency mode MFM (refer to FIG. 3B) through a plurality of circuits without any other additional element and any other signal line except for a scan stage. The increase in the size of the scan stage may be minimized by connecting the first clock signal CLK1 to the first source node S1 of the pull-up transistor TR1 and allowing the third circuit LG3 to receive the first clock signal CLK1 and the second clock signal CLK2 through the first circuit LG1 and the second circuit LG2, respectively. Accordingly, the display panel driving circuit 100C (refer to FIG. 4) in which the area of the non-display area NDA (refer to FIG. 1) is reduced and the display device DD (refer to FIG. 1) including the same may be provided.

Figure 10:
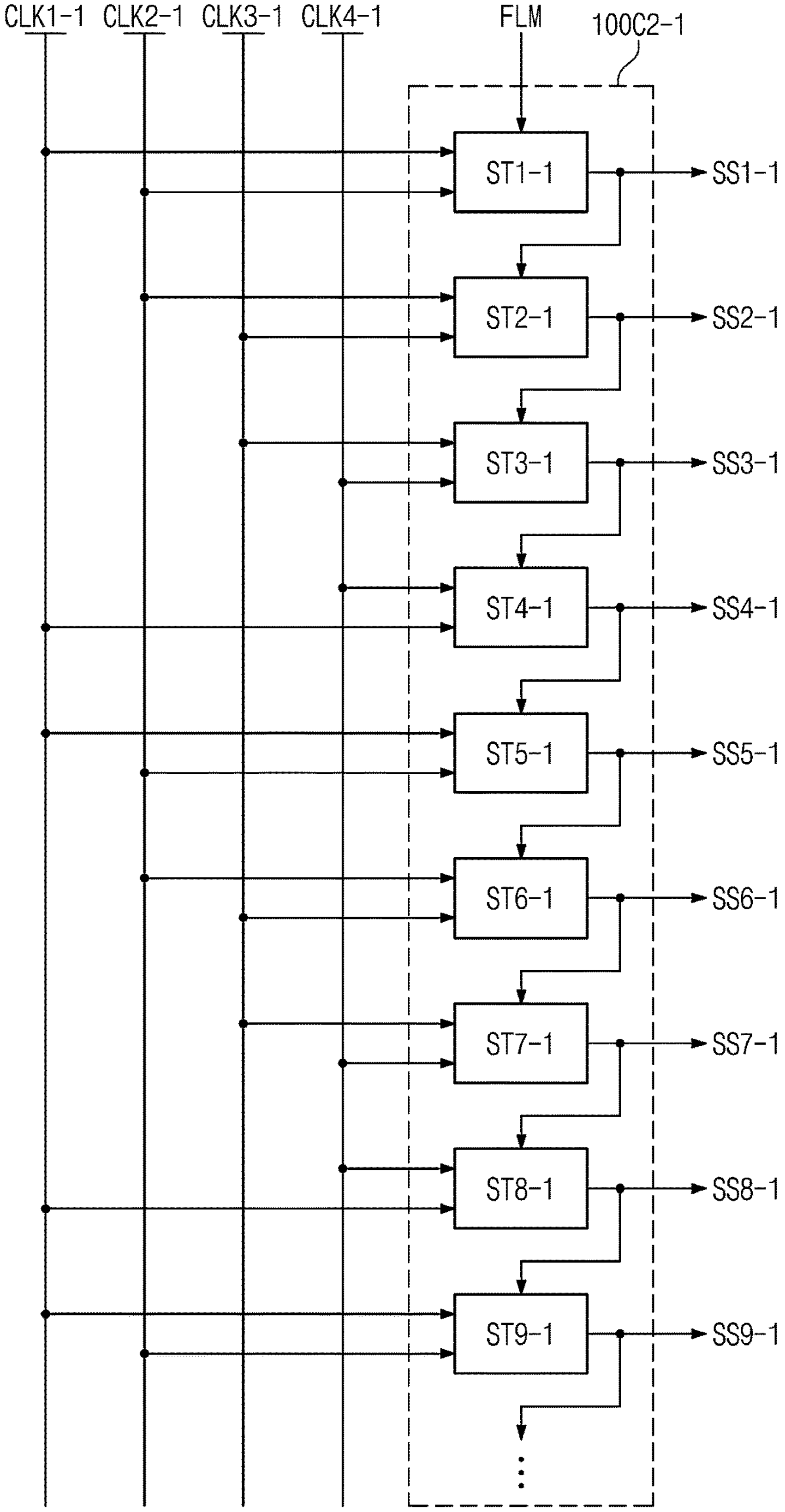
FIG. 10 is a block diagram illustrating an embodiment of a scan driving circuit according to the disclosure.

FIG. 10 is a block diagram illustrating an embodiment of a scan driving circuit according to the disclosure.

Referring to FIGS. 6 and 10, a scan driving circuit 100C2-1 may include a plurality of scan stages ST1-1, ST2-1, ST3-1, ST4-1, ST5-1, ST6-1, ST7-1, ST8-1, and ST9-1. Each of the plurality of scan stages ST1-1 to ST9-1 may receive at least two of a first clock signal CLK1-1, a second clock signal CLK2-1, a third clock signal CLK3-1, and a fourth clock signal CLK4-1. Each of the plurality of scan stages ST1-1 to ST9-1 may receive the carry signal CRY. The plurality of scan stages ST1-1 to ST9-1 may respectively output scan signals SS1-1, SS2-1, SS3-1, SS4-1, SS5-1, SS6-1, SS7-1, SS8-1, and SS9-1.

The plurality of scan stages ST1-1 to ST9-1 may include the first scan stage ST1-1, the second scan stage ST2-1, the third scan stage ST3-1, the fourth scan stage ST4-1, the fifth scan stage ST5-1, the sixth scan stage ST6-1, the seventh scan stage ST7-1, the eighth scan stage ST8-1, and the ninth scan stage ST9-1 arranged in order. Nine scan stages are illustrated in an embodiment of FIG. 10, but the number of scan stages in an embodiment of the disclosure is not limited thereto.

The plurality of scan stages ST1-1 to ST9-1 may respectively correspond to the plurality of scan lines SL1 to SLn (refer to FIG. 4) and may be respectively connected thereto.

The first scan stage ST1-1 among the plurality of scan stages ST1-1 to ST9-1 may receive the start signal FLM as the carry signal CRY from the timing controller 100C1 (refer to FIG. 4).

The remaining scan stages ST2-1, ST3-1, ST4-1, ST5-1, ST6-1, ST7-1, ST8-1, and ST9-1 of the plurality of scan stages ST1-1 to ST9-1 may receive, as the carry signal CRY, the scan signals SS1-1, SS2-1, SS3-1, SS4-1, SS5-1, SS6-1, SS7-1, and SS8-1 respectively output from previous scan stages. In an embodiment, the second scan stage ST2-1 may receive the scan signal SS1-1 output from the first scan stage ST1-1 as the carry signal CRY. The third scan stage ST3-1 may receive the scan signal SS2-1 output from the second scan stage ST2-1 as the carry signal CRY, for example. The fourth scan stage ST4-1 may receive the scan signal SS3-1 output from the third scan stage ST3-1 as the carry signal CRY. The fifth scan stage ST5-1 may receive the scan signal SS4-1 output from the fourth scan stage ST4-1 as the carry signal CRY. The sixth scan stage ST6-1 may receive the scan signal SS5-1 output from the fifth scan stage ST5-1 as the carry signal CRY. The seventh scan stage ST7-1 may receive the scan signal SS6-1 output from the sixth scan stage ST6-1 as the carry signal CRY. The eighth scan stage ST8-1 may receive the scan signal SS7-1 output from the seventh scan stage ST7-1 as the carry signal CRY. The ninth scan stage ST9-1 may receive the scan signal SS8-1 output from the eighth scan stage ST8-1 as the carry signal CRY.

A phase shift may be made in order of the first clock signal CLK1-1, the second clock signal CLK2-1, the third clock signal CLK3-1, and the fourth clock signal CLK4-1.

A phase shift may be made in order of the first clock signal CLK1-1, the second clock signal CLK2-1, the third clock signal CLK3-1, and the fourth clock signal CLK4-1. This will be described later.

Figure 11:
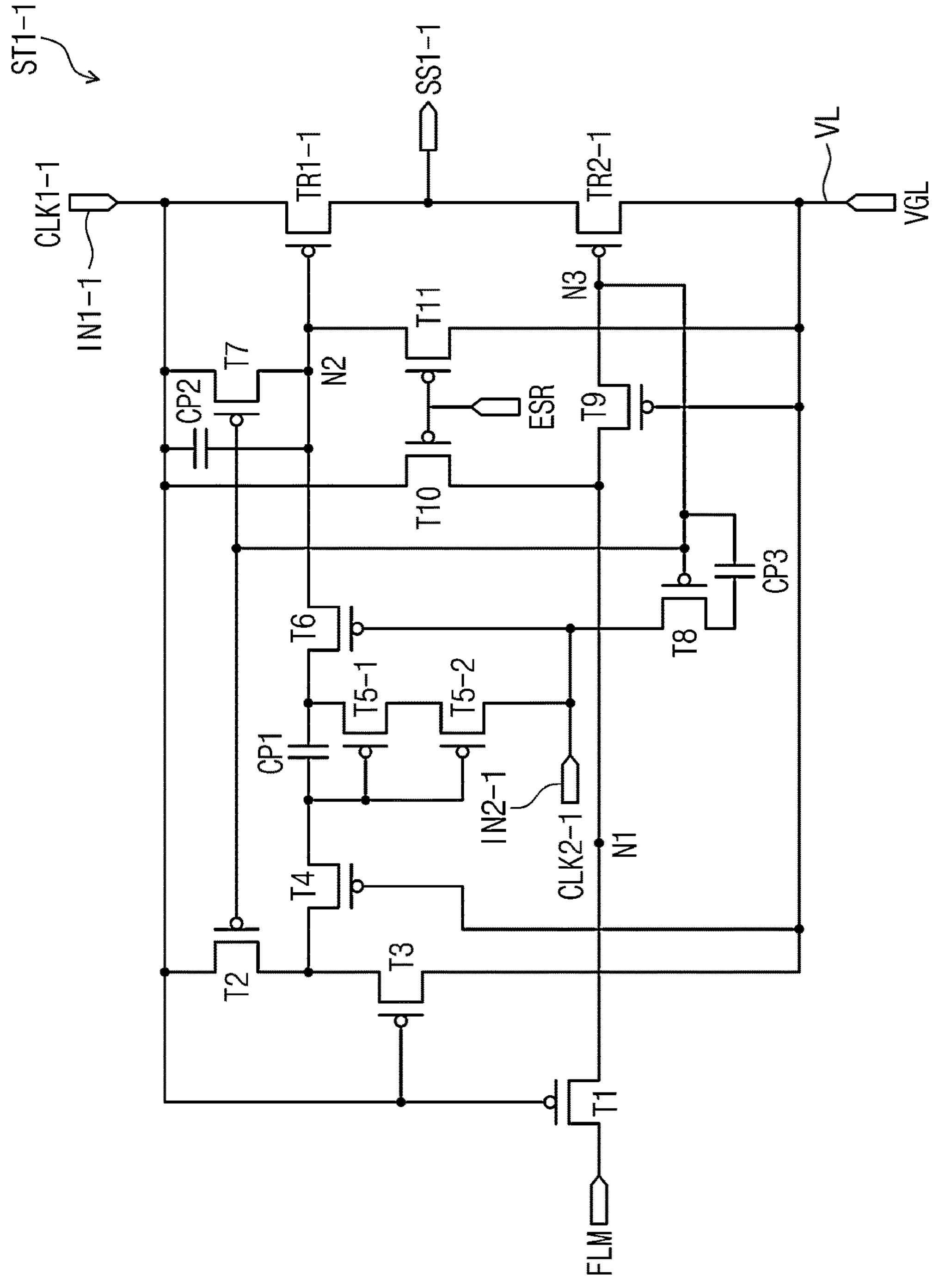
FIG. 11 is a circuit diagram illustrating an embodiment of a scan stage according to the disclosure.

In the first scan stage ST1-1, the first clock signal CLK1-1 may be provided to a first input node IN1-1 (refer to FIG. 11), and the second clock signal CLK2-1 may be provided to a second input node IN2-1 (refer to FIG. 11).

In the second scan stage ST2-1, the second clock signal CLK2-1 may be provided to the first input node IN1-1 (refer to FIG. 11), and the third clock signal CLK3-1 may be provided to the second input node IN2-1 (refer to FIG. 11).

In the third scan stage ST3-1, the third clock signal CLK3-1 may be provided to the first input node IN1-1 (refer to FIG. 11), and the fourth clock signal CLK4-1 may be provided to the second input node IN2-1 (refer to FIG. 11).

In the fourth scan stage ST4-1, the fourth clock signal CLK4-1 may be provided to the first input node IN1-1 (refer to FIG. 11), and the first clock signal CLK1-1 may be provided to the second input node IN2-1 (refer to FIG. 11).

In the fifth scan stage ST5-1, the first clock signal CLK1-1 may be provided to the first input node IN1-1 (refer to FIG. 11), and the second clock signal CLK2-1 may be provided to the second input node IN2-1 (refer to FIG. 11).

In the sixth scan stage ST6-1, the second clock signal CLK2-1 may be provided to the first input node IN1-1 (refer to FIG. 11), and the third clock signal CLK3-1 may be provided to the second input node IN2-1 (refer to FIG. 11).

In the seventh scan stage ST7-1, the third clock signal CLK3-1 may be provided to the first input node IN1-1 (refer to FIG. 11), and the fourth clock signal CLK4-1 may be provided to the second input node IN2-1 (refer to FIG. 11).

In the eighth scan stage ST8-1, the fourth clock signal CLK4-1 may be provided to the first input node IN1-1 (refer to FIG. 11), and the first clock signal CLK1-1 may be provided to the second input node IN2-1 (refer to FIG. 11).

In the ninth scan stage ST9-1, the first clock signal CLK1-1 may be provided to the first input node IN1-1 (refer to FIG. 11), and the second clock signal CLK2-1 may be provided to the second input node IN2-1 (refer to FIG. 11).

The relatively high levels of the first clock signal CLK1-1, the second clock signal CLK2-1, the third clock signal CLK3-1, and the fourth clock signal CLK4-1 may at least partially overlap on the same time.

FIG. 11 is a circuit diagram illustrating an embodiment of a scan stage according to the disclosure.

The first scan stage ST1-1 (also refer to FIG. 10) is illustrated in an embodiment of FIG. 11, but the remaining scan stages ST2-1 to ST9-1 may have the same configuration as the first scan stage ST1-1.

Referring to FIG. 11, the first scan stage ST1-1 may include a plurality of transistors T1 to T11, a plurality of capacitors CP1 to CP3, a pull-up transistor TR1-1, and a pull-down transistor TR2-1. An embodiment in which each of the plurality of transistors T1 to T11 is implemented with a PMOS transistor is illustrated and described, but the disclosure is not limited thereto. In an embodiment, some or all of the plurality of transistors T1 to T11 may be implemented with an n-channel metal-oxide-semiconductor ("NMOS") transistor, for example.

The plurality of transistors T1 to T11 and the plurality of capacitors CP1 to CP3 may constitute the first to third circuits LG1 to LG3 (refer to FIG. 6).

The plurality of transistors T1 to T11 may include the first transistor T1, the second transistor T2, the third transistor T3, the fourth transistor T4, the (5-1)-th transistor T5-1, the (5-2)-th transistor T5-2, the sixth transistor T6, the seventh transistor T7, the eighth transistor T8, the ninth transistor T9, the tenth transistor T10, and the eleventh transistor T11.

The plurality of capacitors CP1 to CP3 may include the first capacitor CP1, the second capacitor CP2, and the third capacitor CP3.

The first scan stage ST1-1 may receive the first clock signal CLK1-1, the second clock signal CLK2-1, and the start signal FLM. However, this is an illustrative embodiment, and the first scan stage ST1-1 in an embodiment of the disclosure may further receive a reset signal ESR.

The first scan stage ST1-1 may receive the low-level voltage VGL through the low-level voltage line VL. The first scan stage ST1-1 may output the scan signal SS1-1.

The first transistor T1 may be connected between an input node to which the start signal FLM is applied and a first node N1, and may include a gate electrode connected to the first input node IN1-1 to which the first clock signal CLK1-1 is provided. The first node N1 may be also referred to as the "intermediate node Q1" (refer to FIG. 7).

The second transistor T2 may be connected between the first input node IN1-1 to which the first clock signal CLK1-1 is provided and the third transistor T3, and may include a gate electrode connected to a gate electrode of the seventh transistor T7.

The third transistor T3 may be connected between an input node to which the low-level voltage VGL is provided and the second transistor T2, and may include a gate electrode connected to the first input node IN1-1 to which the first clock signal CLK1-1 is provided. The input node to which the low-level voltage VGL is provided may be also referred to as the "low-level voltage line VL".

The fourth transistor T4 may be connected between a connection node where the second transistor T2 and the third transistor T3 are connected and a first end of the first capacitor CP1, and may include a gate electrode connected to the low-level voltage line VL.

The (5-1)-th transistor T5-1 and the (5-2)-th transistor T5-2 may be connected in series between a second end of the first capacitor CP1 and the second input node IN2-1 to which the second clock signal CLK2-1 is provided. Each of the (5-1)-th transistor T5-1 and the (5-2)-th transistor T5-2 may include a gate electrode connected to the first end of the first capacitor CP1.

The sixth transistor T6 may be connected between the second end of the first capacitor CP1 and a second node N2, and may include a gate electrode connected to the second input node IN2-1 to which the second clock signal CLK2-1 is provided. The second node N2 may be also referred to as the "first control node QB2" (refer to FIG. 7).

The seventh transistor T7 may be connected between the first input node IN1-1 to which the first clock signal CLK1-1 is provided and the second node N2, and may include the gate electrode connected to the gate electrode of the second transistor T2.

The second capacitor CP2 may be connected between the second node N2 and the first input node IN1-1 to which the first clock signal CLK1-1 is provided.

The eighth transistor T8 may be connected between the second input node IN2-1 to which the second clock signal CLK2-1 is provided and a first end of the third capacitor CP3, and may include a gate electrode connected to the gate electrodes of the second and seventh transistors T2 and T7 and a second end of the third capacitor CP3.

The ninth transistor T9 may be connected between the first node N1 and a third node N3, and may include a gate electrode connected to the low-level voltage line VL. The third node N3 may be also referred to as the "second control node Q2" (refer to FIG. 7).

The tenth transistor T10 may be connected between the first input node IN1-1 to which the first clock signal CLK1-1 is provided and the first node N1, and may include a gate electrode connected to an input node to which the reset signal ESR is provided.

The eleventh transistor T11 may be connected between the second node N2 and the low-level voltage line VL, and may include a gate electrode connected to the input node to which the reset signal ESR is provided.

The reset signal ESR may be a signal included in the first control signal CONT1 (refer to FIG. 4) provided from the timing controller 100C1 (refer to FIG. 4). When the display device DD (refer to FIG. 1) is powered on or is reset, the reset signal ESR may be a signal that is activated to be logically low. When the reset signal ESR is at the relatively low level, the tenth transistor T10 and the eleventh transistor T11 may be turned on. The low-level voltage VGL may be provided to the second node N2. That is, the second node N2 may be maintained at the relatively low level. The first clock signal CLK1-1 may be provided to the third node N3. A signal corresponding to the first clock signal CLK1-1 may be provided to an output terminal from which the scan signal SS1-1 is output. Accordingly, when the display device DD (refer to FIG. 1) is powered on or is reset, the scan signal SS1-1 of an unintended level may be prevented from being output from the output terminal.

The pull-up transistor TR1-1 may be connected between the first input node IN1-1 to which the first clock signal CLK1-1 is provided and the output terminal from which the scan signal SS1-1 is output, and may include a gate electrode connected to the second node N2.

The pull-down transistor TR2-1 may be connected between the output terminal from which the scan signal SS1-1 is output and the low-level voltage line VL, and may include a gate electrode connected to the third node N3.

Figure 12:
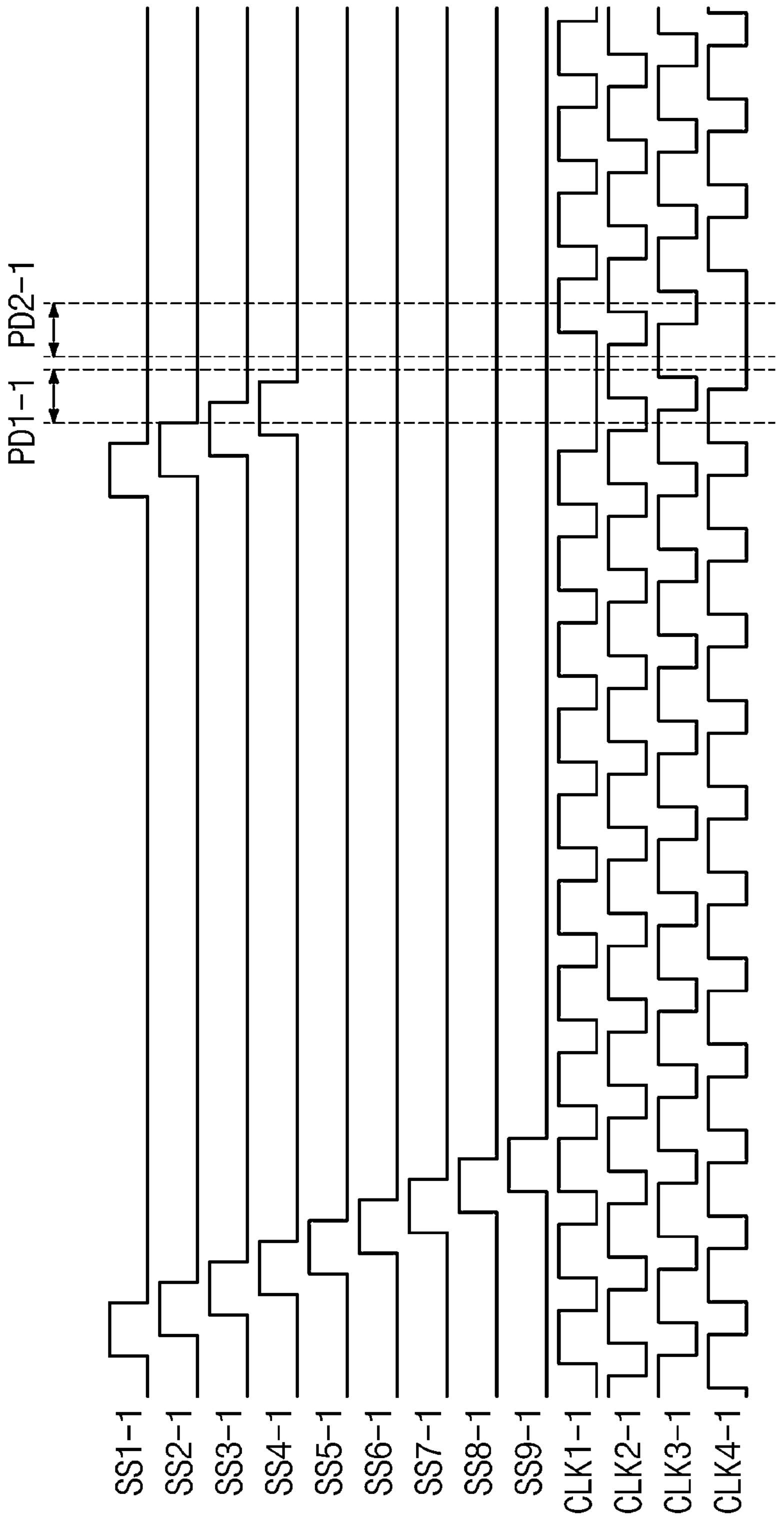
FIG. 12 is a waveform diagram illustrating an embodiment of a driving operation of a plurality of scan stages according to the disclosure.

FIG. 12 is a waveform diagram illustrating an embodiment of a driving operation of a plurality of scan stages according to the disclosure.

Referring to FIGS. 10 to 12, in each of the first to fourth clock signals CLK1-1 to CLK4-1, a first voltage and a second voltage may be repeated at a given period. The first voltage may be higher in level than the second voltage. The second voltage may be the low-level voltage VGL. The given period may be one horizontal period 1H or more. In an embodiment, the given period may correspond to eight horizontal periods, for example.

Each of the first to fourth clock signals CLK1-1 to CLK4-1 may have a pulse width of one horizontal period 1H (refer to FIG. 9) or more. In an embodiment, the pulse width may correspond to five horizontal periods, for example.

A phase shift may be made in order of the first clock signal CLK1-1, the second clock signal CLK2-1, the third clock signal CLK3-1, and the fourth clock signal CLK4-1.

When the start signal FLM of the high-level voltage VGH is provided to the first scan stage ST1-1, the first scan stage ST1-1 may output the first scan signal SS1-1 after a delay corresponding to two horizontal periods. In this case, the start signal FLM may be output from the timing controller 100C1 (refer to FIG. 4) and may be provided to the first scan stage ST1-1 as the carry signal CRY.

The second scan stage ST2-1 may receive the first scan signal SS1-1 as the carry signal CRY (refer to FIG. 6). The second scan stage ST2-1 may output the second scan signal SS2-1 after a delay corresponding to two horizontal periods.

The third scan stage ST3-1 may receive the second scan signal SS2-1 as the carry signal CRY (refer to FIG. 6). The third scan stage ST3-1 may output the third scan signal SS3-1 after a delay corresponding to two horizontal periods.

The fourth scan stage ST4-1 may receive the third scan signal SS3-1 as the carry signal CRY (refer to FIG. 6). The fourth scan stage ST4-1 may output the fourth scan signal SS4-1 after a delay corresponding to two horizontal periods.

The fifth scan stage ST5-1 may receive the fourth scan signal SS4-1 as the carry signal CRY (refer to FIG. 6). The fifth scan stage ST5-1 may output the fifth scan signal SS5-1 after a delay corresponding to two horizontal periods.

The sixth scan stage ST6-1 may receive the fifth scan signal SS5-1 as the carry signal CRY (refer to FIG. 6). The sixth scan stage ST6-1 may output the sixth scan signal SS6-1 after a delay corresponding to two horizontal periods.

The seventh scan stage ST7-1 may receive the sixth scan signal SS6-1 as the carry signal CRY (refer to FIG. 6). The seventh scan stage ST7-1 may output the seventh scan signal SS7-1 after a delay corresponding to two horizontal periods.

The eighth scan stage ST8-1 may receive the seventh scan signal SS7-1 as the carry signal CRY (refer to FIG. 8). The eighth scan stage ST8-1 may output the eighth scan signal SS8-1 after a delay corresponding to two horizontal periods.

The ninth scan stage ST9-1 may receive the eighth scan signal SS8-1 as the carry signal CRY (refer to FIG. 8). The ninth scan stage ST9-1 may output the ninth scan signal SS9-1 after a delay corresponding to two horizontal periods.

The scan driving circuit 100C2-1 may include the plurality of scan stages ST1-1 to ST9-1. The scan driving circuit 100C2-1 may sequentially supply the plurality of scan signals SS1-1 to SS9-1 to the plurality of scan lines SL1 to SLn (refer to FIG. 4), respectively. The scan driving circuit 100C2-1 may sequentially drive the plurality of scan lines SL1 to SLn (refer to FIG. 4). When a predetermined scan line is driven by the scan driving circuit 100C2-1, the data driving circuit 100C4 (refer to FIG. 4) may output grayscale voltages to the plurality of data lines DL1 to DLm (refer to FIG. 4). As such, the display device DD (refer to FIG. 1) may display the images IM1 and IM2 (refer to FIG. 1) in the display area DA (refer to FIG. 1).

Afterwards, when the start signal FLM of the high-level voltage VGH is provided to the first scan stage ST1-1, the first scan stage ST1-1 may output the first scan signal SS1-1 after a delay corresponding to two horizontal periods.

The second scan stage ST2-1 may receive the first scan signal SS1-1 as the carry signal CRY (refer to FIG. 6). The second scan stage ST2-1 may output the second scan signal SS2-1 after a delay corresponding to two horizontal periods.

The third scan stage ST3-1 may receive the second scan signal SS2-1 as the carry signal CRY (refer to FIG. 6). The third scan stage ST3-1 may output the third scan signal SS3-1 after a delay corresponding to two horizontal periods.

The fourth scan stage ST4-1 may receive the third scan signal SS3-1 as the carry signal CRY (refer to FIG. 6). The fourth scan stage ST4-1 may output the fourth scan signal SS4-1 after a delay corresponding to two horizontal periods.

In the multi-frequency mode MFM (refer to FIG. 3B), the timing controller 100C1 (refer to FIG. 4) may mask a partial period PD1-1 of the first clock signal CLK1-1 provided to a scan stage, which is connected to the second display area AA2 (PD1-1 FIG. 3B), from among the plurality of scan stages ST1-1 to ST9-1. An embodiment in which a partial period of the first clock signal CLK1-1 provided to the fifth scan stage ST5-1 is masked is illustrated in FIG. 12. The partial period PD1-1 may be also referred to as a "first masking period PD1-1".

In the first masking period PD1-1, the first clock signal CLK1-1 may be masked. When the first clock signal CLK1-1 is masked, the first clock signal CLK1 may have the second voltage. That is, the masked first clock signal CLK1-1 may have the low-level voltage VGL.

The fifth scan stage ST5-1 may receive the fourth scan signal SS4-1 as the carry signal CRY (refer to FIG. 6) and may receive the first clock signal CLK1-1 having the low-level voltage VGL through the first input node IN1-1. In this case, the fifth scan stage ST5-1 may output the fifth scan signal SS5-1 having the low-level voltage VGL. That is, the fifth scan stage ST5-1 may not output the fifth scan signal SS5-1 having the active level due to the masked first clock signal CLK1-1.

When "0" is input to the first input node IN1-1, a scan signal whose level corresponds to "0" may be output.

As the fifth scan signal SS5-1 having the low-level voltage VGL is provided, the sixth scan stage ST6-1 may not be driven. That is, scan stages following the fifth scan stage ST5-1 may not be driven due to the first masking period PD1-1.

When the first clock signal CLK1-1, the second clock signal CLK2-1, the third clock signal CLK3-1, or the fourth clock signal CLK4-1 provided to the first input node IN1-1 of each of the plurality of scan stages ST1-1 to ST9-1 is masked, each of the plurality of scan stages ST1-1 to ST9-1 may respectively output the corresponding scan signal SSx (x being one of one to nine) having the second voltage.

According to the disclosure, in the multi-frequency mode MFM (refer to FIG. 3B), when the second driving frequency is 1 Hz, the second image IM2 (refer to FIG. 3B) may be displayed in the second display area DA2 (refer to FIGS. 1, 2A and 2B) only at the first frame F1 (refer to FIG. 3B); because a clock signal provided to the first input node IN1-1 is masked, an image may not be displayed at the remaining frames F2 to F120 (refer to FIG. 3B). Accordingly, the display device DD (refer to FIG. 1) in which power consumption is reduced may be provided.

In the multi-frequency mode MFM (refer to FIG. 3B), a second masking period PD2-1 may be further provided. In the second masking period PD2-1, the fourth clock signal CLK4-1 may be masked. In the second masking period PD2-1, the fourth scan stage ST4-1 may be controlled such that a scan signal is not output after the fourth scan signal SS4-1 is output.

Figure 13:
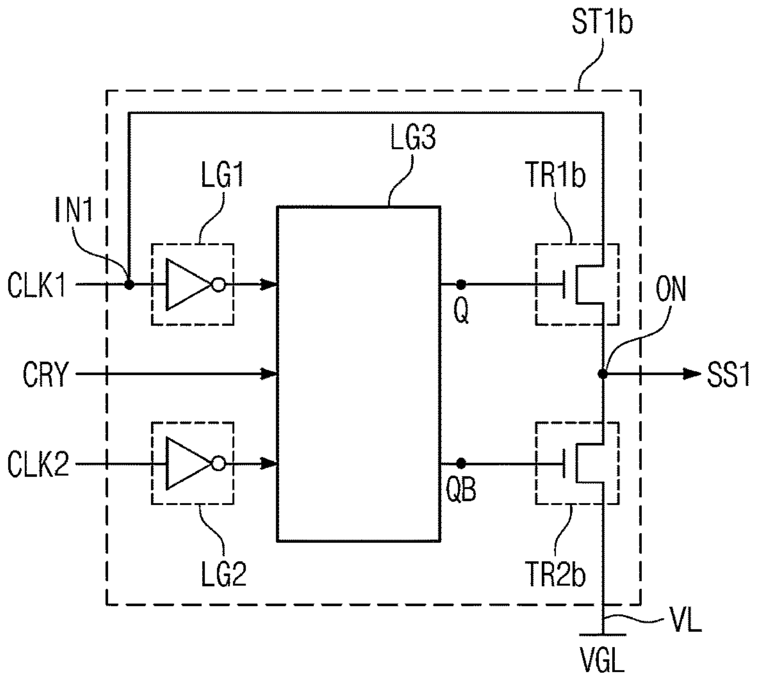
FIG. 13 is a block diagram illustrating an embodiment of a scan stage according to the disclosure.

FIG. 13 is a block diagram illustrating an embodiment of a scan stage according to the disclosure. In the description of FIG. 13, the components that are described with reference to FIG. 6 are marked by the same reference numerals/signs.

A first scan stage ST1*b* is illustrated in an embodiment of FIG. 13, but the remaining scan stages may have the same configuration as the first scan stage ST1*b*.

Referring to FIG. 13, the first scan stage ST1*b* may include the first circuit LG1, the second circuit LG2, the third circuit LG3, a pull-up transistor TR1*b*, and a pull-down transistor TR2*b*.

The pull-up transistor TR1*b* may be electrically connected between the first input node IN1 and the output node ON and may be turned on/off by the second control node Q. The pull-up transistor TR1*b* is a transistor that supplies the scan signal SS1 corresponding to the first clock signal CLK1 to the first scan line SL1 (refer to FIG. 4) through the output node ON. The pull-up transistor TR1*b* may be an NMOS transistor.

The pull-down transistor TR2*b* may be electrically connected between the output node ON and the low-level voltage line VL and may be turned on/off by the first control node QB. The pull-down transistor TR2*b* is a transistor that supplies the scan signal SS1 corresponding to the low-level voltage VGL to the first scan line SL1 (refer to FIG. 4) through the output node ON. The pull-down transistor TR2*b* may be an NMOS transistor.

The pull-up transistor TR1*b* and the pull-down transistor TR2*b* may be turned on at different timings from each other.

Figure 14:
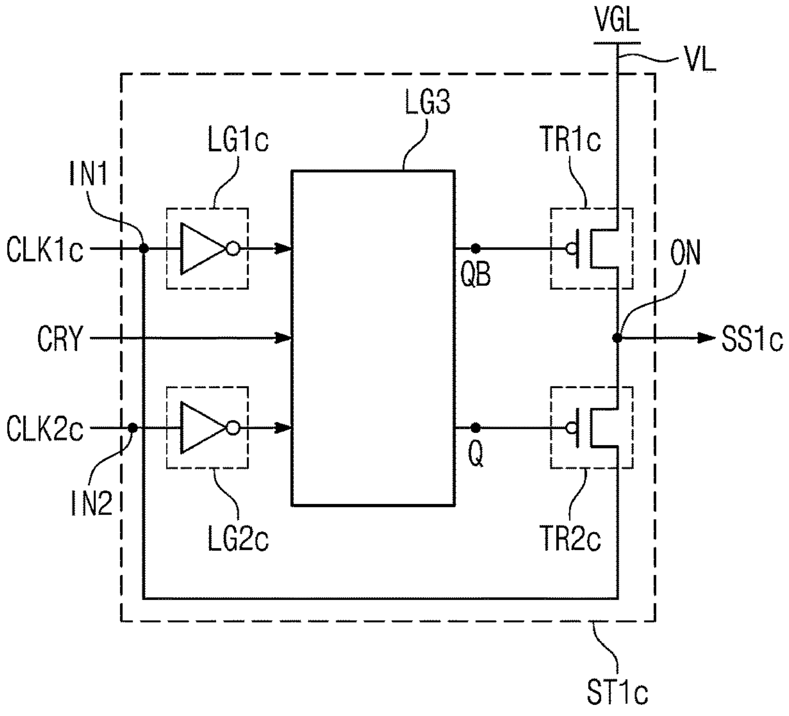
FIG. 14 is a block diagram illustrating an embodiment of a scan stage according to the disclosure.

FIG. 14 is a block diagram illustrating an embodiment of a scan stage according to the disclosure. In the description of FIG. 14, the components that are described with reference to FIG. 6 are marked by the same reference numerals/signs, and thus, additional description will be omitted to avoid redundancy.

A first scan stage ST1*c* is illustrated in an embodiment of FIG. 14, but the remaining scan stages may have the same configuration as the first scan stage ST1*c*.

Referring to FIG. 14, a first clock signal CLK1*c* and a second clock signal CLK2*c* may be a normally high signal.

The first scan stage ST1*c* may include a first circuit LG1*c*, a second circuit LG2*c*, the third circuit LG3, a pull-up transistor TR1*c*, and a pull-down transistor TR2*c*.

The first circuit LG1*c* may be connected to the first input node IN1 of receiving one of the first clock signal CLK1*c* and the second clock signal CLK2*c*. In an embodiment, the first circuit LG1*c* may receive the first clock signal CLK1*c*, for example. The first circuit LG1*c* may include a NOT gate.

The second circuit LG2*c* may be connected to the second input node IN2 of receiving the other of the first clock signal CLK1*c* and the second clock signal CLK2*c*. In an embodiment, the second circuit LG2*c* may receive the second clock signal CLK2*c*. The second circuit LG2*c* may include a NOT gate, for example.

The pull-up transistor TR1*c* may be electrically connected between the output node ON and the low-level voltage line VL and may be turned on/off by the first control node QB. The pull-up transistor TR1*c* is a transistor that supplies a scan signal SS1*c* corresponding to the low-level voltage VGL to the first scan line SL1 (refer to FIG. 4) through the output node ON. The pull-up transistor TR1*c* may be a PMOS transistor.

The pull-down transistor TR2*c* may be electrically connected between the output node ON and the first input node IN1 and may be turned on/off by the second control node Q. The pull-down transistor TR2*c* is a transistor that supplies the scan signal SS1*c* corresponding to the first clock signal CLK1c to the first scan line SL1 (refer to FIG. 4) through the output node ON. The pull-down transistor TR2c may be a PMOS transistor.

The pull-up transistor TR1c and the pull-down transistor TR2c may be turned on at different timings from each other.

Figure 15:
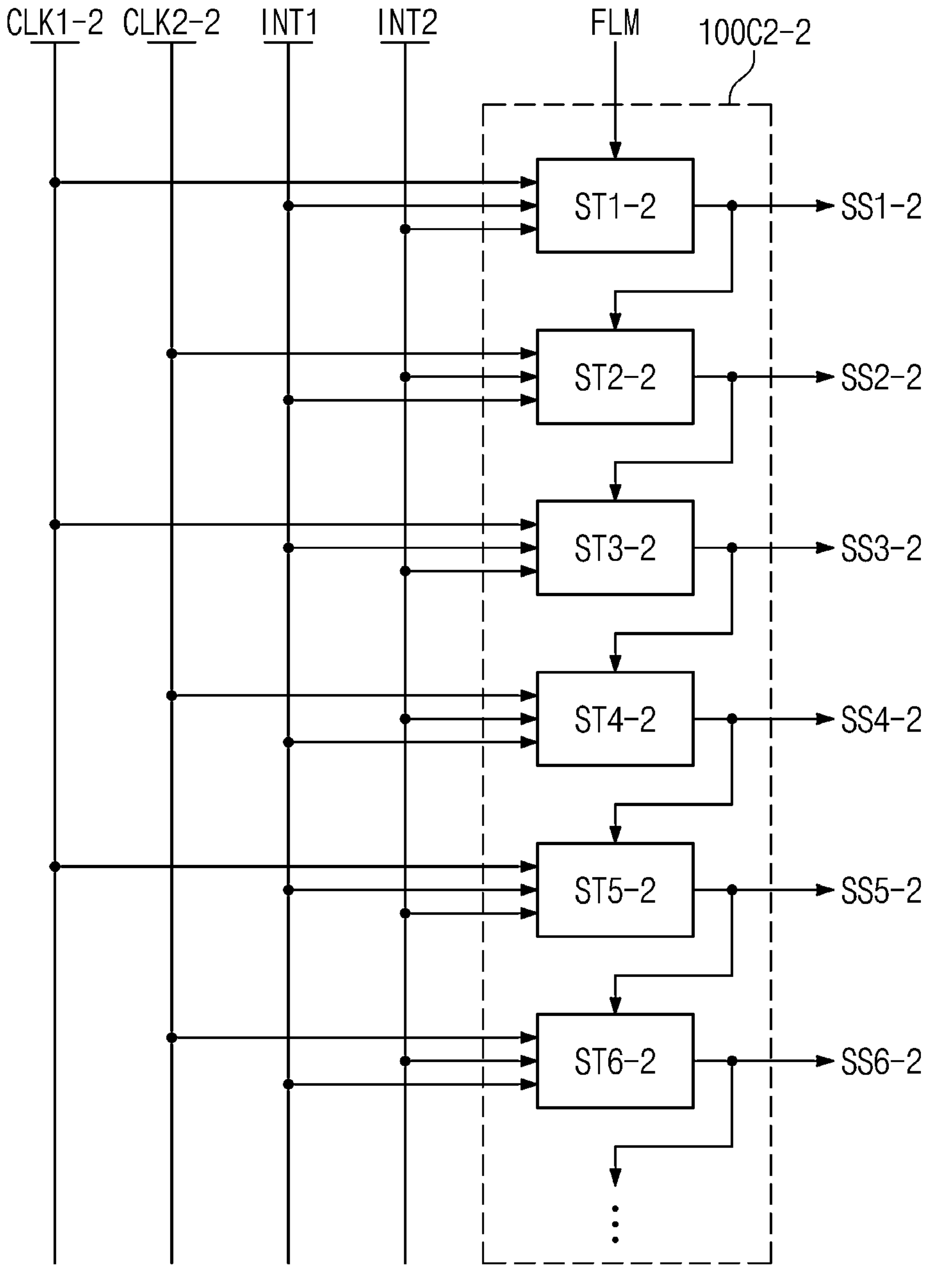
FIG. 15 is a block diagram illustrating an embodiment of a scan driving circuit according to the disclosure.

FIG. 15 is a block diagram illustrating an embodiment of a scan driving circuit according to the disclosure.

Referring to FIG. 15, a scan driving circuit 100C2-2 may include a plurality of scan stages ST1-2, ST2-2, ST3-2, ST4-2, ST5-2, and ST6-2. Each of the plurality of scan stages ST1-2 to ST6-2 may receive a first logic clock signal INT1, a second logic clock signal INT2, and one of a first clock signal CLK1-2 and a second clock signal CLK2-2. The plurality of scan stages ST1-2 to ST6-2 may respectively output scan signals SS1-2, SS2-2, SS3-2, SS4-2, SS5-2, and SS6-2.

The plurality of scan stages ST1-2 to ST6-2 may include the first scan stage ST1-2, the second scan stage ST2-2, the third scan stage ST3-2, the fourth scan stage ST4-2, the fifth scan stage ST5-2, and the sixth scan stage ST6-2 arranged in order. Six scan stages are illustrated in an embodiment of FIG. 15, but the number of scan stages in an embodiment of the disclosure is not limited thereto.

The plurality of scan stages ST1-2 to ST6-2 may respectively correspond to the plurality of scan lines SL1 to SLn (refer to FIG. 4) and may be respectively connected thereto.

The first scan stage ST1-2 among the plurality of scan stages ST1-2 to ST6-2 may receive the start signal FLM as the carry signal CRY (refer to FIG. 6) from the timing controller 100C1 (refer to FIG. 4).

When the start signal FLM of the high-level voltage VGH is provided to the first scan stage ST1-2 after the scan signals SS1-2 to SS5-2 are output from previous scan stages, each of the remaining scan stages ST2-2 to ST6-2 of the plurality of scan stages ST1-2 to ST6-2 may receive a scan signal from a previous scan stage as the carry signal CRY (refer to FIG. 6). In an embodiment, the second scan stage ST2-2 may receive the scan signal SS1-2 output from the first scan stage ST1-2 as the carry signal CRY (refer to FIG. 6), for example. The third scan stage ST3-2 may receive the scan signal SS2-2 output from the second scan stage ST2-2 as the carry signal CRY (refer to FIG. 6). The fourth scan stage ST4-2 may receive the scan signal SS3-2 output from the third scan stage ST3-2 as the carry signal CRY (refer to FIG. 6). The fifth scan stage ST5-2 may receive the scan signal SS4-2 output from the fourth scan stage ST4-2 as the carry signal CRY (refer to FIG. 6). The sixth scan stage ST6-2 may receive the scan signal SS5-2 output from the fifth scan stage ST5-2 as the carry signal CRY (refer to FIG. 6).

In the first clock signal CLK1-2, a first voltage and a second voltage may be repeated at a given period. The first voltage may be higher in level than the second voltage.

The phase of the second clock signal CLK2-2 may be opposite to the phase of the first clock signal CLK1-2.

The first clock signal CLK1-2 may be provided to each of the odd-numbered scan stages of the plurality of scan stages ST1-2 to ST6-2. In an embodiment, the first clock signal CLK1-2 may be provided to the first scan stage ST1-2, the third scan stage ST3-2, and the fifth scan stage ST5-2, for example.

The second clock signal CLK2-2 may be provided to each of the even-numbered scan stages of the plurality of scan stages ST1-2 to ST6-2. In an embodiment, the second clock signal CLK2-2 may be provided to the second scan stage ST2-2, the fourth scan stage ST4-2, and the sixth scan stage ST6-2, for example.

In the first logic clock signal INT1, the first voltage and the second voltage may be repeated at a given period. The phase of the second logic clock signal INT2 may be opposite to the phase of the first logic clock signal INT1.

The first logic clock signal INT1 and the second logic clock signal INT2 may be provided to each of the plurality of scan stages ST1-2 to ST6-2.

Figure 16:
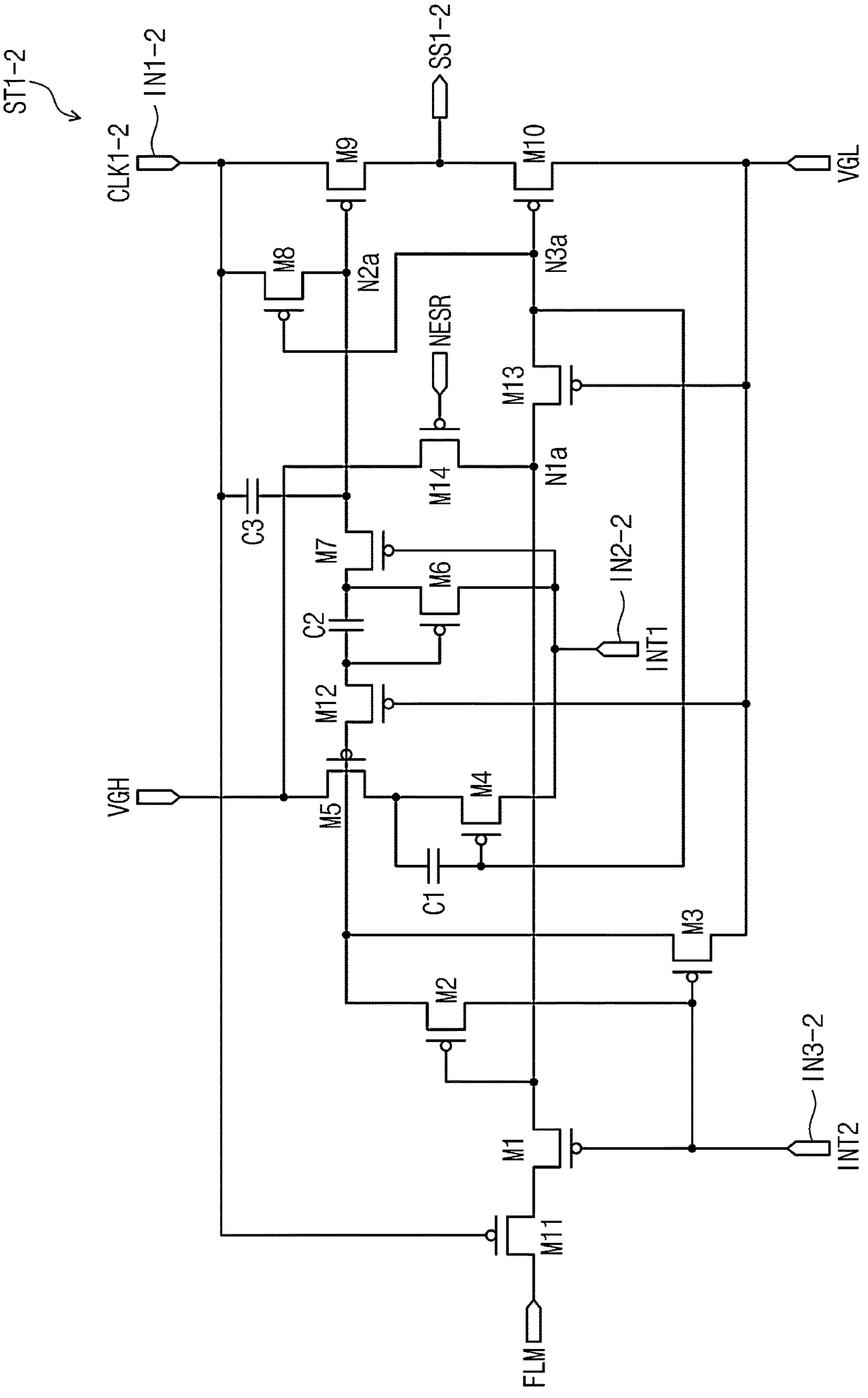
FIG. 16 is a circuit diagram illustrating an embodiment of a scan stage according to the disclosure.

In the first scan stage ST1-2, the first clock signal CLK1-2 may be provided to a first input node IN1-2 (refer to FIG. 16), the first logic clock signal INT1 may be provided to a second input node IN2-2 (refer to FIG. 16), and the second logic clock signal INT2 may be provided to a third input node IN3-2 (refer to FIG. 16).

In the second scan stage ST2-2, the second clock signal CLK2-2 may be provided to the first input node IN1-2 (refer to FIG. 16), the second logic clock signal INT2 may be provided to the second input node IN2-2 (refer to FIG. 16), and the first logic clock signal INT1 may be provided to the third input node IN3-2 (refer to FIG. 16).

In the third scan stage ST3-2, the first clock signal CLK1-2 may be provided to the first input node IN1-2 (refer to FIG. 16), the first logic clock signal INT1 may be provided to the second input node IN2-2 (refer to FIG. 16), and the second logic clock signal INT2 may be provided to the third input node IN3-2 (refer to FIG. 16).

In the fourth scan stage ST4-2, the second clock signal CLK2-2 may be provided to the first input node IN1-2 (refer to FIG. 16), the second logic clock signal INT2 may be provided to the second input node IN2-2 (refer to FIG. 16), and the first logic clock signal INT1 may be provided to the third input node IN3-2 (refer to FIG. 16).

In the fifth scan stage ST5-2, the first clock signal CLK1-2 may be provided to the first input node IN1-2 (refer to FIG. 16), the first logic clock signal INT1 may be provided to the second input node IN2-2 (refer to FIG. 16), and the second logic clock signal INT2 may be provided to the third input node IN3-2 (refer to FIG. 16).

In the sixth scan stage ST6-2, the second clock signal CLK2-2 may be provided to the first input node IN1-2 (refer to FIG. 16), the second logic clock signal INT2 may be provided to the second input node IN2-2 (refer to FIG. 16), and the first logic clock signal INT1 may be provided to the third input node IN3-2 (refer to FIG. 16).

FIG. 16 is a circuit diagram illustrating an embodiment of a scan stage according to the disclosure.

The first scan stage ST1-2 (refer to FIG. 15) is illustrated in an embodiment of FIG. 16, but the remaining scan stages ST2-2 to ST6-2 may have the same configuration as the first scan stage ST1-2.

Referring to FIG. 16, the first scan stage ST1-2 may include a plurality of transistors M1 to M14 and a plurality of capacitors C1 to C3. An embodiment in which each of the plurality of transistors M1 to M14 is implemented with a p-channel metal-oxide-semiconductor ("PMOS") transistor is illustrated and described, but the disclosure is not limited thereto. In an embodiment, some or all of the plurality of transistors M1 to M14 may be implemented with an NMOS transistor, for example.

The plurality of transistors M1 to M8 and M11 to M14 and the plurality of capacitors C1 to C3 may constitute the first to third circuits LG1 to LG3 (refer to FIG. 6).

The plurality of transistors M1 to M14 may include the first transistor M1, the second transistor M2, the third transistor M3, the fourth transistor M4, the fifth transistor M5, the sixth transistor M6, the seventh transistor M7, the eighth transistor M8, the ninth transistor M9, the tenth transistor M10, the eleventh transistor M11, the twelfth transistor M12, the thirteenth transistor M13, and the fourteenth transistor M14.

The plurality of capacitors C1 to C3 may include the first capacitor C1, the second capacitor C2, and the third capacitor C3.

The first scan stage ST1-2 may receive the first clock signal CLK1-2, the first logic clock signal INT1, the second logic clock signal INT2, and the start signal FLM. However, this is an illustrative embodiment, and the first scan stage ST1-2 in an embodiment of the disclosure may further receive a reset signal NESR.

The first scan stage ST1-2 may receive the low-level voltage VGL and the high-level voltage VGH. The first scan stage ST1-2 may output the scan signal SS1-2.

The first transistor M1 may be connected between the eleventh transistor M11 and a first node N1*a*, and may include a gate electrode connected to the third input node IN3-2 to which the second logic clock signal INT2 is provided.

The second transistor M2 may be connected between the third input node IN3-2 and the third transistor M3, and may include a gate electrode connected to the first node N1*a*.

The third transistor M3 may be connected between the second transistor M2 and an input node to which the low-level voltage VGL is provided, and may include a gate electrode connected to the third input node IN3-2.

The fourth transistor M4 may be connected between a first end of the first capacitor C1 and the second input node IN2-2 to which the first logic clock signal INT1 is provided, and may include a gate electrode connected to a third node N3*a*.

The first capacitor C1 may include the first end connected to the fourth transistor M4 and the fifth transistor M5 and a second end connected to the third node N3*a*.

The fifth transistor M5 may be connected between the input node to which the high-level voltage VGH is provided and the first end of the first capacitor C1, and may include a gate electrode connected to the second transistor M2, the third transistor M3, and the twelfth transistor M12.

The sixth transistor M6 may be connected between the second input node IN2-2 and a first end of the second capacitor C2, and may include a gate electrode connected to the twelfth transistor M12.

The second capacitor C2 may include the first end connected to the sixth transistor M6 and the seventh transistor M7 and a second end connected to the twelfth transistor M12 and the gate electrode of the sixth transistor M6.

The seventh transistor M7 may be connected between the first end of the second capacitor C2 and a second node N2*a*, and may include a gate electrode connected to the second input node IN2-2.

The third capacitor C3 may include a first end connected to the seventh transistor M7 and a gate electrode of the ninth transistor M9 and a second end connected to the first input node IN1-2.

The eighth transistor M8 may be connected between the first input node IN1-2 to which the first clock signal CLK1-2 is provided and the second node N2*a*, and may include a gate electrode connected to the third node N3*a*.

The ninth transistor M9 may be connected between the first input node IN1-2 and an output terminal from which the scan signal SS1-2 is output, and may include a gate electrode connected to the second node N2*a*. The ninth transistor M9 may be also referred to as the "pull-up transistor TR1" (refer to FIG. 6). The second node N2*a* may be also referred to as the "first control node QB" (refer to FIG. 6).

The tenth transistor M10 may be connected between the output terminal from which the scan signal SS1-2 and the input node to which the low-level voltage VGL is provided, and may include a gate electrode connected to the third node N3*a*. The tenth transistor M10 may be also referred to as the "pull-down transistor TR2" (refer to FIG. 6). The third node N3*a* may be also referred to as the "second control node Q" (refer to FIG. 6).

The eleventh transistor M11 may be connected between the input node to which the start signal FLM is provided and the first transistor M1, and may include a gate electrode connected to the first input node IN1-2.

The twelfth transistor M12 may be connected between the gate electrode of the fifth transistor M5 and the second end of the second capacitor C2, and may include a gate electrode connected to the input node to which the low-level voltage VGL is provided.

The thirteenth transistor M13 may be connected between the first node N1*a* and the third node N3*a*, and may include a gate electrode connected to the input node to which the low-level voltage VGL is provided.

The fourteenth transistor M14 may be connected between the first node N1*a* and the input node to which the high-level voltage VGH is provided, and may include a gate electrode connected to an input node to which the reset signal NESR is provided. By the reset signal NESR, the scan signal SS1-2 of an unintended level may be prevented from being output from the output terminal.

Figure 17:
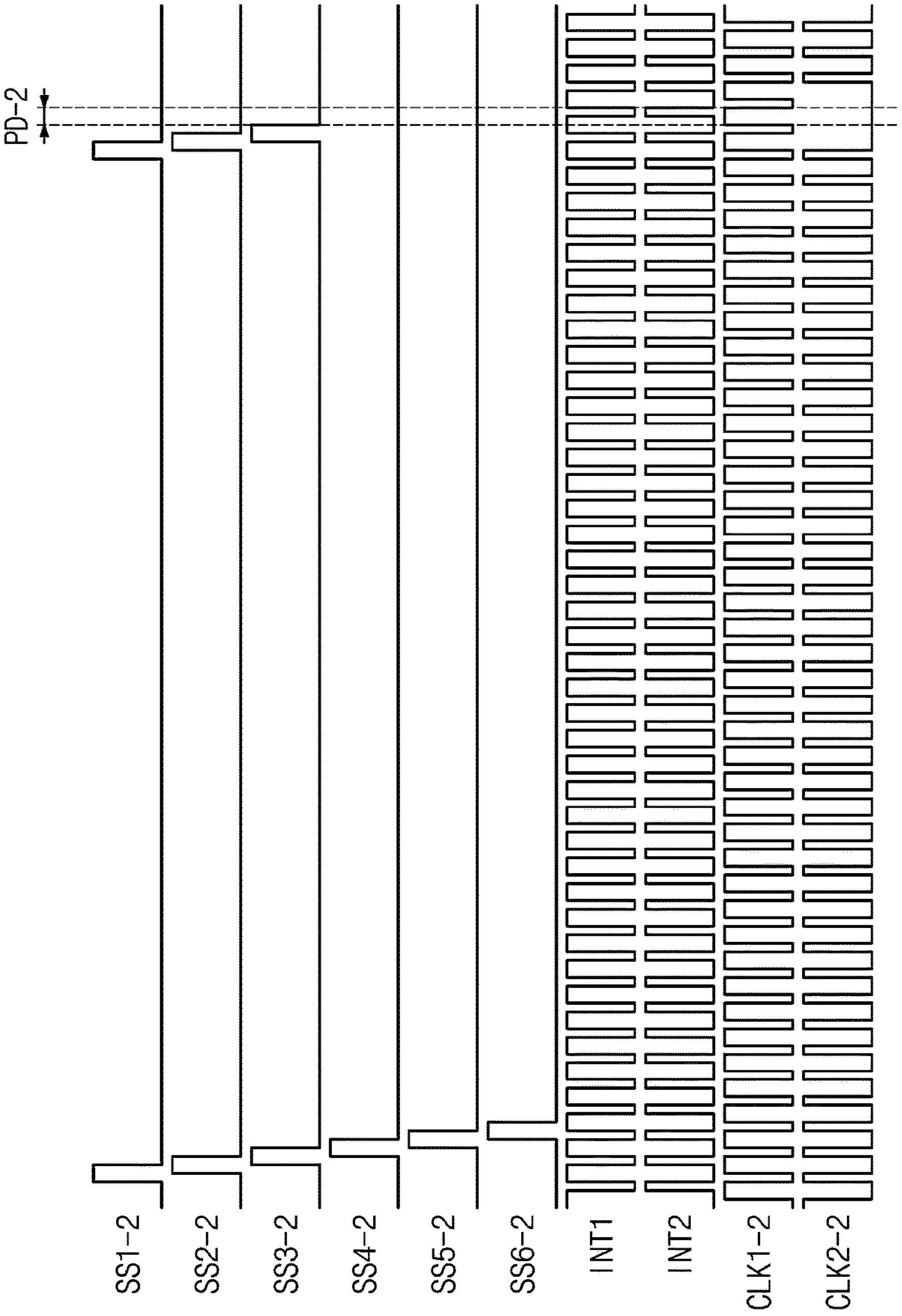
FIG. 17 is a waveform diagram illustrating an embodiment of a driving operation of a plurality of scan stages according to the disclosure.

FIG. 17 is a waveform diagram illustrating an embodiment of a driving operation of a plurality of scan stages according to the disclosure.

Referring to FIGS. 15 to 17, in each of the first clock signal CLK1-2 and the second clock signal CLK2-2, a first voltage and a second voltage may be repeated at a given period. The first voltage may be higher in level than the second voltage. The first voltage may be the high-level voltage VGH. The second voltage may be the low-level voltage VGL. The given period may be one horizontal period 1H (refer to FIG. 9).

In each of the first logic clock signal INT1 and the second logic clock signal INT2, the first voltage and the second voltage may be repeated at the given period. The first logic clock signal INT1 may be a signal obtained by shifting the first clock signal CLK1-2 as much as a given interval (or phase).

When the start signal FLM of the high-level voltage VGH is provided to the first scan stage ST1-2, the first scan stage ST1*a* may output the first scan signal SS1-2 after a delay corresponding to one horizontal period. In this case, the start signal FLM may be output from the timing controller 100C1 (refer to FIG. 4) and may be provided to the first scan stage ST1-2 as the carry signal CRY.

The second scan stage ST2-2 may receive the first scan signal SS1-2 as the carry signal CRY (refer to FIG. 6). The second scan stage ST2-2 may output the second scan signal SS2-2 after a delay corresponding to one horizontal period.

The third scan stage ST3-2 may receive the second scan signal SS2-2 as the carry signal CRY (refer to FIG. 6). The third scan stage ST3-2 may output the third scan signal SS3-2 after a delay corresponding to one horizontal period.

The fourth scan stage ST4-2 may receive the third scan signal SS3-2 as the carry signal CRY (refer to FIG. 6). The fourth scan stage ST4-2 may output the fourth scan signal SS4-2 after a delay corresponding to one horizontal period.

The fifth scan stage ST5-2 may receive the fourth scan signal SS4-2 as the carry signal CRY (refer to FIG. 6). The fifth scan stage ST5-2 may output the fifth scan signal SS5-2 after a delay corresponding to one horizontal period.

The sixth scan stage ST6-2 may receive the fifth scan signal SS5-2 as the carry signal CRY (refer to FIG. 6). The sixth scan stage ST6-2 may output the sixth scan signal SS6-2 after a delay corresponding to one horizontal period.

The scan driving circuit 100C2-2 may include the plurality of scan stages ST1-2 to ST6-2. The scan driving circuit 100C2-2 may sequentially supply the plurality of scan signals SS1-2 to SS6-2 to the plurality of scan lines SL1 to SLn (refer to FIG. 4), respectively. The scan driving circuit 100C2-2 may sequentially drive the plurality of scan lines SL1 to SL4 (refer to FIG. 4). When a predetermined scan line is driven by the scan driving circuit 100C2-2, the data driving circuit 100C4 (refer to FIG. 4) may output grayscale voltages to the plurality of data lines DL1 to DLm (refer to FIG. 4). As such, the display device DD (refer to FIG. 1) may display the images IM1 and IM2 (refer to FIG. 1) in the display area DA (refer to FIG. 1).

Afterwards, when the start signal FLM of the high-level voltage VGH is provided to the first scan stage ST1-2, the first scan stage ST1-2 may output the first scan signal SS1-2 after a delay corresponding to one horizontal period.

The second scan stage ST2-2 may receive the first scan signal SS1-2 as the carry signal CRY (refer to FIG. 6). The second scan stage ST2-2 may output the second scan signal SS2-2 after a delay corresponding to one horizontal period.

The third scan stage ST3-2 may receive the second scan signal SS2-2 as the carry signal CRY (refer to FIG. 6). The third scan stage ST3-2 may output the third scan signal SS3-2 after a delay corresponding to one horizontal period.

In the multi-frequency mode MFM (refer to FIG. 3B), the timing controller 100C1 (refer to FIG. 4) may mask a partial period PD-2 of the first clock signal CLK1-2 or the second clock signal CLK2-2 provided to a scan stage, which is connected to the second display area AA2 (refer to FIG. 3B), from among the plurality of scan stages ST1-2 to ST6-2. An embodiment in which a partial period of the second clock signal CLK2-2 provided to the fourth scan stage ST4-2 is masked is illustrated in FIG. 17. The partial period PD-2 may be also referred to as a “masking period PD-2”.

In the masking period PD-2, the second clock signal CLK2-2 may be masked. When the second clock signal CLK2-2 is masked, the second clock signal CLK2-2 may have the second voltage. That is, the masked second clock signal CLK2-2 may have the low-level voltage VGL.

The fourth scan stage ST4-2 may receive the third scan signal SS3-2 as the carry signal CRY (refer to FIG. 6). In this case, because the fourth scan stage ST4-2 receives the second clock signal CLK2-1 having the low-level voltage VGL through the first input node IN1-2, the fourth scan stage ST4-2 may output the fourth scan signal SS4-2 having the low-level voltage VGL. That is, the fourth scan stage ST4-2 may not output the fourth scan signal SS4-2 having the active level by the masked second clock signal CLK2-2.

When “0” is input to the first input node IN1-2, a scan signal whose level corresponds to “0” may be output.

As the fourth scan signal SS4-2 having the low-level voltage VGL is provided, the fifth scan stage ST5-2 may not be driven. That is, scan stages following the fourth scan stage ST4-2 may not be driven due to the masking period PD-2.

When the first clock signal CLK1-2 or the second clock signal CLK2-2 provided to the first input node IN1-2 of each of the plurality of scan stages ST1-2 to ST6-2 is masked, each of the plurality of scan stages ST1-2 to ST6-2 may output the corresponding scan signal SSy-2 (y being one of one to six) having the second voltage.

According to the disclosure, in the multi-frequency mode MFM (refer to FIG. 3B), when the second driving frequency is 1 Hz, the second image IM2 (refer to FIG. 3B) may be displayed in the second display area DA2 (refer to FIGS. 1, 2A and 2B) only at the first frame F1 (refer to FIG. 3B); because a clock signal provided to the first input node IN1-2 is masked, an image may not be displayed at the remaining frames F2 to F120 (refer to FIG. 3B). Accordingly, the display device DD (refer to FIG. 1) in which power consumption is reduced may be provided.

Figure 18:
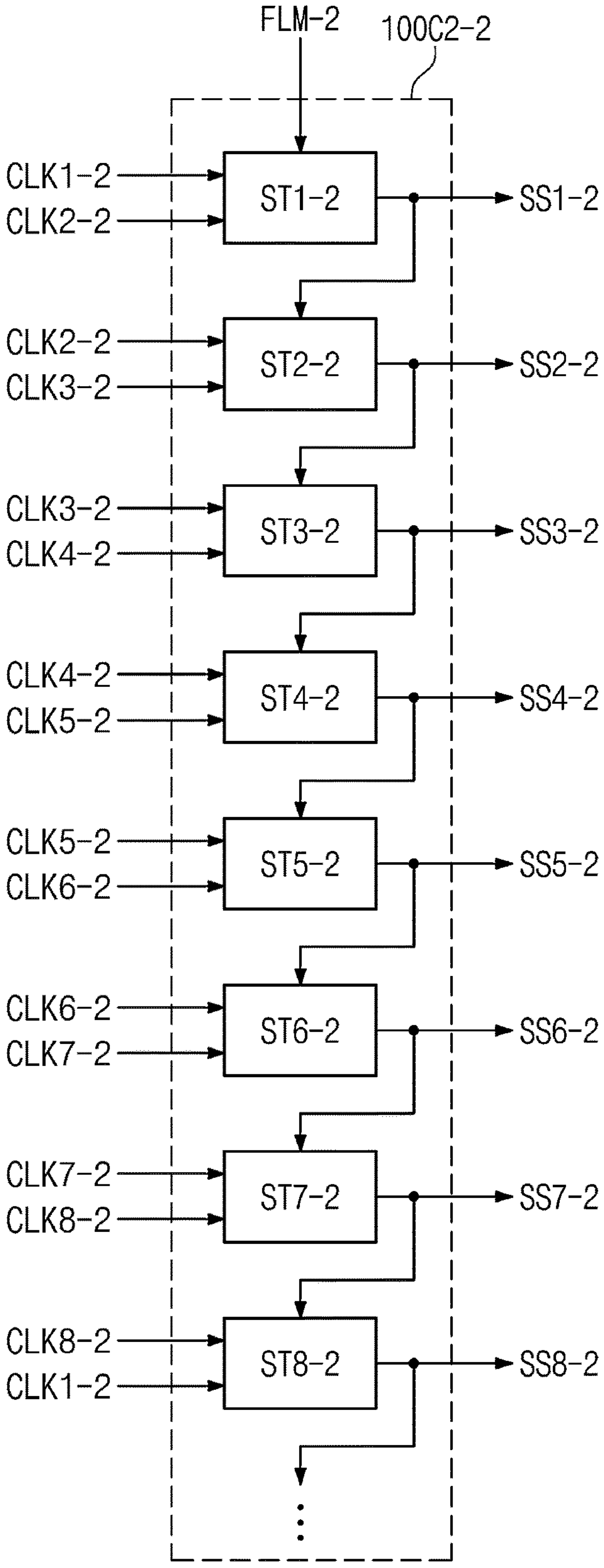
FIG. 18 is a block diagram illustrating an embodiment of a scan driving circuit according to the disclosure.
Figure 19:
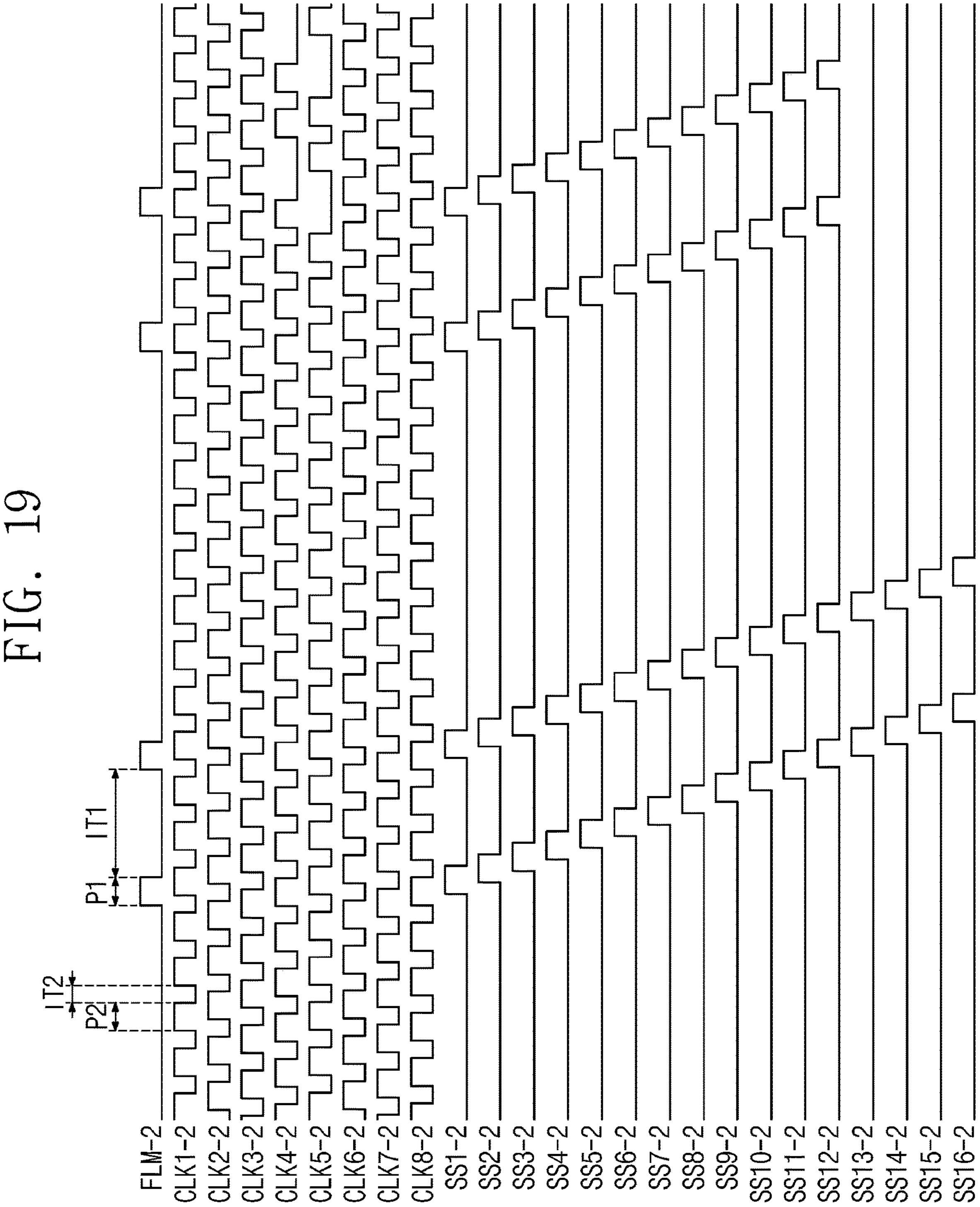
FIG. 19 is a waveform diagram illustrating an embodiment of a driving operation of a plurality of scan stages according to the disclosure.

FIG. 18 is a block diagram illustrating an embodiment of a scan driving circuit according to the disclosure, and FIG. 19 is a waveform diagram illustrating an embodiment of a driving operation of a plurality of scan stages according to the disclosure.

Referring to FIGS. 6, 18, and 19, the scan driving circuit 100C2-2 may include a plurality of scan stages ST1-2, ST2-2, ST3-2, ST4-2, ST5-2, ST6-2, ST7-2, and ST8-2. Each of the plurality of scan stages ST1-2 to ST8-2 may include at least two of a first clock signal CLK1-2, a second clock signal CLK2-2, a third clock signal CLK3-2, a fourth clock signal CLK4-2, a fifth clock signal CLK5-2, a sixth clock signal CLK6-2, a seventh clock signal CLK7-2, and an eighth clock signal CLK8-2. The plurality of scan stages ST1-2 to ST8-2 may respectively output scan signals SS1-2, SS2-2, SS3-2, SS4-2, SS5-2, SS6-2, SS7-2, and SS8-2.

The plurality of scan stages ST1-2 to ST8-2 may include the first scan stage ST1-2, the second scan stage ST2-2, the third scan stage ST3-2, the fourth scan stage ST4-2, the fifth scan stage ST5-2, the sixth scan stage ST6-2, the seventh scan stage ST7-2, and the eighth scan stage ST8-2 arranged in order. Eight scan stages are illustrated in an embodiment of FIG. 18, but the number of scan stages in an embodiment of the disclosure is not limited thereto. In an embodiment, eight scan stages may be further included in order after the eighth scan stage ST8-2 and may respectively output scan signals SS9-2, SS10-2, SS11-2, SS12-2, SS13-2, SS14-2, SS15-2, and SS16-2, for example.

The plurality of scan stages ST1-2 to ST8-2 may respectively correspond to the plurality of scan lines SL1 to SLn (refer to FIG. 4) and may be respectively connected thereto.

The first scan stage ST1-2 among the plurality of scan stages ST1-2 to ST8-2 may receive a start signal FLM-2 as the carry signal CRY from the timing controller 100C1 (refer to FIG. 4).

The start signal FLM-2 may toggle twice or more during one frame. A width P1 of one toggle pulse of the start signal FLM-2 may correspond to five horizontal periods. An interval IT1 between toggle pulses of the start signal FLM-2 may correspond to sixteen horizontal periods. That is, the interval IT1 between toggle pulses may correspond to two periods of each of the clock signals CLK1-2 to CLK8-2.

The remaining scan stages ST2-2, ST3-2, ST4-2, ST5-2, ST6-2, ST7-2, and ST8-2 of the plurality of scan stages ST1-2 to ST8-2 may receive, as the carry signal CRY, the scan signals SS1-2, SS2-2, SS3-2, SS4-2, SS5-2, SS6-2, and SS7-2 respectively output from previous scan stages.

A phase shift may be made in order of the first clock signal CLK1-2, the second clock signal CLK2-2, the third clock signal CLK3-2, and the fourth clock signal CLK4-2.

The fifth clock signal CLK5-2 may have the same phase and waveform as the first clock signal CLK1-2. The sixth clock signal CLK6-2 may have the same phase and waveform as the second clock signal CLK2-2. The seventh clock signal CLK7-2 may have the same phase and waveform as the third clock signal CLK3-2. The eighth clock signal CLK8-2 may have the same phase and waveform as the fourth clock signal CLK4-2.

In the first scan stage ST1-2, the first clock signal CLK1-2 may be provided to the first input node IN1, and the second clock signal CLK2-2 may be provided to the second input node IN2.

In the second scan stage ST2-2, the second clock signal CLK2-2 may be provided to the first input node IN1, and the third clock signal CLK3-2 may be provided to the second input node IN2.

In the third scan stage ST3-2, the third clock signal CLK3-2 may be provided to the first input node IN1, and the fourth clock signal CLK4-2 may be provided to the second input node IN2.

In the fourth scan stage ST4-2, the fourth clock signal CLK4-2 may be provided to the first input node IN1, and the fifth clock signal CLK5-2 may be provided to the second input node IN2.

In the fifth scan stage ST5-2, the fifth clock signal CLK5-2 may be provided to the first input node IN1, and the sixth clock signal CLK6-2 may be provided to the second input node IN2.

In the sixth scan stage ST6-2, the sixth clock signal CLK6-2 may be provided to the first input node IN1, and the seventh clock signal CLK7-2 may be provided to the second input node IN2.

In the seventh scan stage ST7-2, the seventh clock signal CLK7-2 may be provided to the first input node IN1, and the eighth clock signal CLK8-2 may be provided to the second input node IN2.

In the eighth scan stage ST8-2, the eighth clock signal CLK8-2 may be provided to the first input node IN1, and the first clock signal CLK1-2 may be provided to the second input node IN2.

The relatively high levels of the first clock signal CLK1-2, the second clock signal CLK2-2, the third clock signal CLK3-2, and the fourth clock signal CLK4-2 may at least partially overlap on the same time.

In each of the clock signals CLK1-2 to CLK8-2, a first voltage and a second voltage may be repeated at a given period. The first voltage may be higher in level than the second voltage. The second voltage may be the low-level voltage VGL. A portion having the first voltage may have a given pulse width P2. The pulse width P2 may be identical to the width P1 of one toggle pulse of the start signal FLM-2. The pulse width P2 may have five horizontal periods.

A portion having the second voltage may have a given interval IT2. The interval IT2 may have three horizontal periods. The interval IT2 may have an odd horizontal period. In an embodiment, the interval IT2 may correspond to five horizontal periods, for example.

Each of the clock signals CLK1-2 to CLK8-2 may be repeated at a period corresponding to eight horizontal periods.

In this case, conditions expressed by Equation 1 and Equation 2 below may be satisfied between the clock signals CLK1-2 to CLK8-2.

$$CLK_{(n)}=CLK_{((n)+(a)(m-1))} \quad \text{[Equation 1]}$$

$$CLK_{(n)}(\theta)=CLK_{((n)+(a/2)(m-1))}(\theta) \quad \text{[Equation 2]}$$

In Equation 1 and Equation 2 above, each of the "n" and the "m" may be a natural number, and the "a" may be a natural number being an even number. The "θ" may indicate a phase.

In the example illustrated in FIGS. 18 and 19, in Equation 1 and Equation 2 above, the "m" may be three, and the "a" may be four.

$CLK_{(n)}$ may indicate an n-th clock signal. In an embodiment, when the "n" is 1, $CLK_{(1)}$ may refer to the first clock signal CLK1-2, for example. In this case, $CLK_{(1)}$ may be identical to $CLK_{(1+4(3-1))}$. That is, $CLK_{(1)}$ may be identical to $CLK_{(9)}$, and the first clock signal CLK1-2 may be identical to a ninth clock signal.

$CLK_{(1)}(\theta)$ may be identical to $CLK_{(1+2(3-1))}(\theta)$. That is, $CLK_{(1)}(\theta)$ may be identical to $CLK_{(5)}(\theta)$, and the phase of the first clock signal CLK1-2 may be identical to the phase of the fifth clock signal CLK5-2.

When the start signal FLM-2 including a toggle pulse of the high-level voltage VGH is provided to the first scan stage ST1-2, the first scan stage ST1-2 may output the first scan signal SS1-2 after a delay corresponding to two horizontal periods. In this case, the start signal FLM-2 may be output from the timing controller 100C1 (refer to FIG. 4) and may be provided to the first scan stage ST1-2 as the carry signal CRY.

The second scan stage ST2-2 may receive the first scan signal SS1-2 as the carry signal CRY. The second scan stage ST2-2 may output the second scan signal SS2-2 after a delay corresponding to two horizontal periods.

The third scan stage ST3-2 may receive the second scan signal SS2-2 as the carry signal CRY. The third scan stage ST3-2 may output the third scan signal SS3-2 after a delay corresponding to two horizontal periods.

The fourth scan stage ST4-2 may receive the third scan signal SS3-2 as the carry signal CRY. The fourth scan stage ST4-2 may output the fourth scan signal SS4-2 after a delay corresponding to two horizontal periods.

The fifth scan stage ST5-2 may receive the fourth scan signal SS4-2 as the carry signal CRY. The fifth scan stage ST5-2 may output the fifth scan signal SS5-2 after a delay corresponding to two horizontal periods.

The sixth scan stage ST6-2 may receive the fifth scan signal SS5-2 as the carry signal CRY. The sixth scan stage ST6-2 may output the sixth scan signal SS6-2 after a delay corresponding to two horizontal periods.

The seventh scan stage ST7-2 may receive the sixth scan signal SS6-2 as the carry signal CRY. The seventh scan stage ST7-2 may output the seventh scan signal SS7-2 after a delay corresponding to two horizontal periods.

The eighth scan stage ST8-2 may receive the seventh scan signal SS7-2 as the carry signal CRY. The eighth scan stage ST8-2 may output the eighth scan signal SS8-2 after a delay corresponding to two horizontal periods.

The ninth to sixteenth scan stages may respectively receive the scan signals SS8-2, SS9-2, SS10-2, SS11-2, SS12-2, SS13-2, SS14-2, and SS15-2 output from previous scan stages as the carry signal CRY. The ninth to sixteenth scan stages may respectively output the scan signals SS9-2, SS10-2, SS11-2, SS12-2, SS13-2, SS14-2, SS15-2, and SS16-2.

In the multi-frequency mode MFM (refer to FIG. 3B), the timing controller 100C1 (refer to FIG. 4) may mask a partial period of clock signal provided to a scan stage, which is connected to the second display area AA2 (refer to FIG. 3B), from among the plurality of scan stages ST1-2 to ST8-2. An embodiment in which a partial period of the fifth clock signal CLK5-2 provided to the thirteenth scan stage is masked is illustrated in FIG. 19.

When the fifth clock signal CLK5-2 is masked, the fifth clock signal CLK5-2 may have the second voltage. That is, the masked fifth clock signal CLK5-2 may have the low-level voltage VGL.

The thirteenth scan stage (not illustrated) may receive the twelfth scan signal SS12-2 as the carry signal CRY. The fifth clock signal CLK5-2 having the low-level voltage VGL may be input to the first input node IN1 of the thirteenth scan stage. That is, the thirteenth scan stages may not output the thirteenth scan signal SS13-2 having the active level by the masked fifth clock signal CLK5-2.

When "0" is input to the first input node IN1, a scan signal whose level corresponds to "0" may be output.

As the thirteenth scan signal SS13-2 having the low-level voltage VGL is provided, the fourteenth scan stage may not be driven. That is, as the fifth clock signal CLK5-2 is masked, scan stages following the thirteenth scan stage may not be driven.

After the fifth clock signal CLK5-2 is masked, a portion of the fourth clock signal CLK4-2 may be masked. Accordingly, it may be possible to prevent the interference capable of being caused when a portion of the fifth clock signal CLK5-2 is masked. However, this is an illustrative embodiment. In an embodiment of the disclosure, after the fifth clock signal CLK5-2 is masked, a portion of the eighth clock signal CLK8-2 may be masked.

According to the disclosure, the following phenomenon may be prevented in the configuration where the start signal FLM-2 toggles twice or more during one frame: when clock signals satisfy Equation 1 and Equation 2 above and the interval IT2 has an odd horizontal period, a scan signal generated based on the second toggle pulse of the start signal FLM-2 is masked by a clock signal. According to the above description, the display device DD (refer to FIG. 1) whose reliability is improved may be provided.

Also, according to the disclosure, in the multi-frequency mode MFM (refer to FIG. 3B), when the second driving frequency is 1 Hz, the second image IM2 (refer to FIG. 3B) may be displayed in the second display area DA2 (refer to FIGS. 1, 2A and 2B) only at the first frame F1 (refer to FIG. 3B); because a clock signal provided to the first input node IN1 is masked, an image may not be displayed at the remaining frames F2 to F120 (refer to FIG. 3B). Accordingly, the display device DD (refer to FIG. 1) in which power consumption is reduced may be provided.

Figure 20:
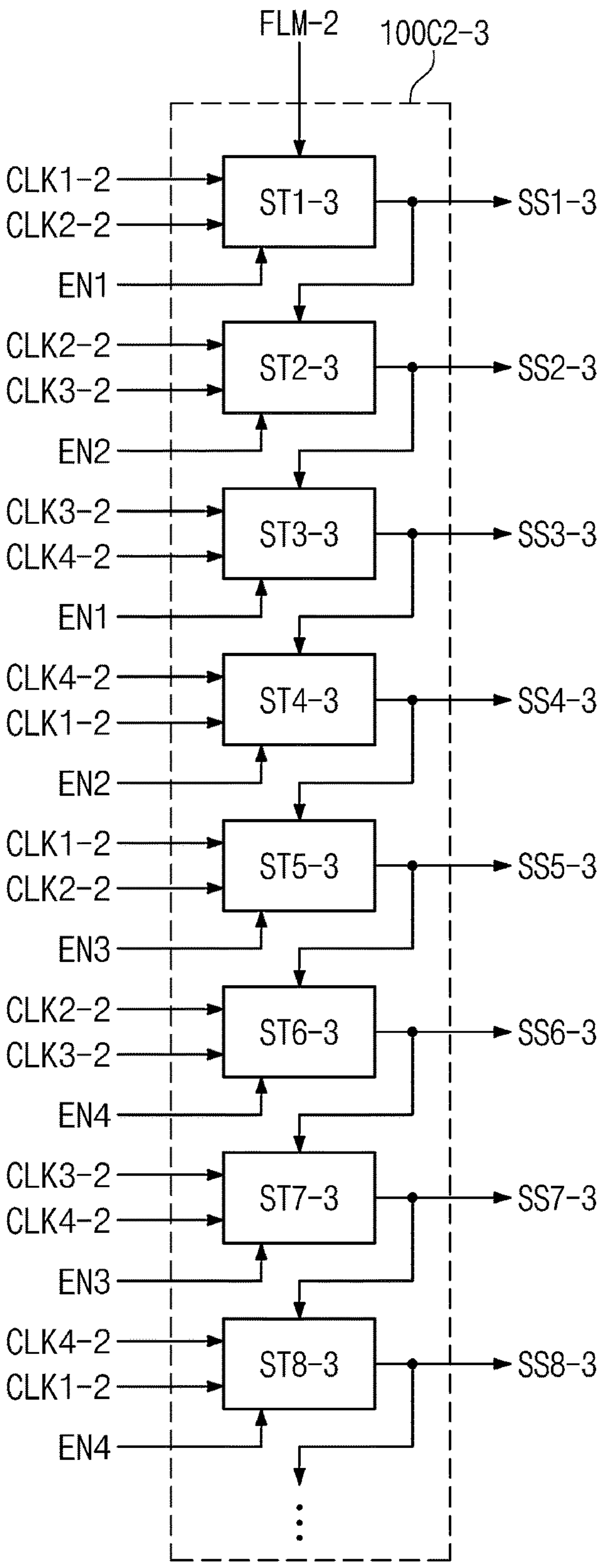
FIG. 20 is a block diagram illustrating an embodiment of a scan driving circuit according to the disclosure.
Figure 21:
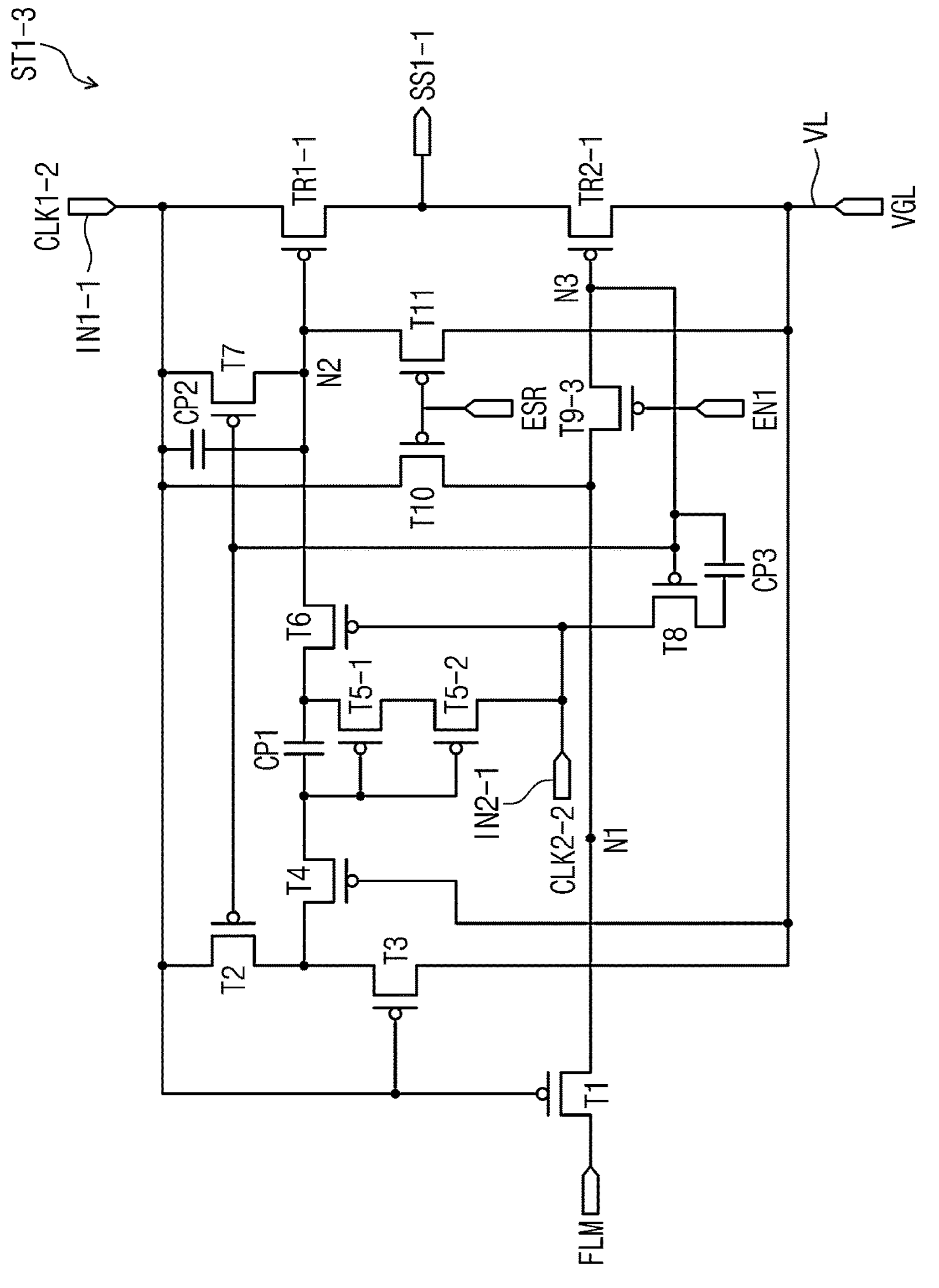
FIG. 21 is a circuit diagram illustrating an embodiment of a scan stage according to the disclosure.
Figure 22:
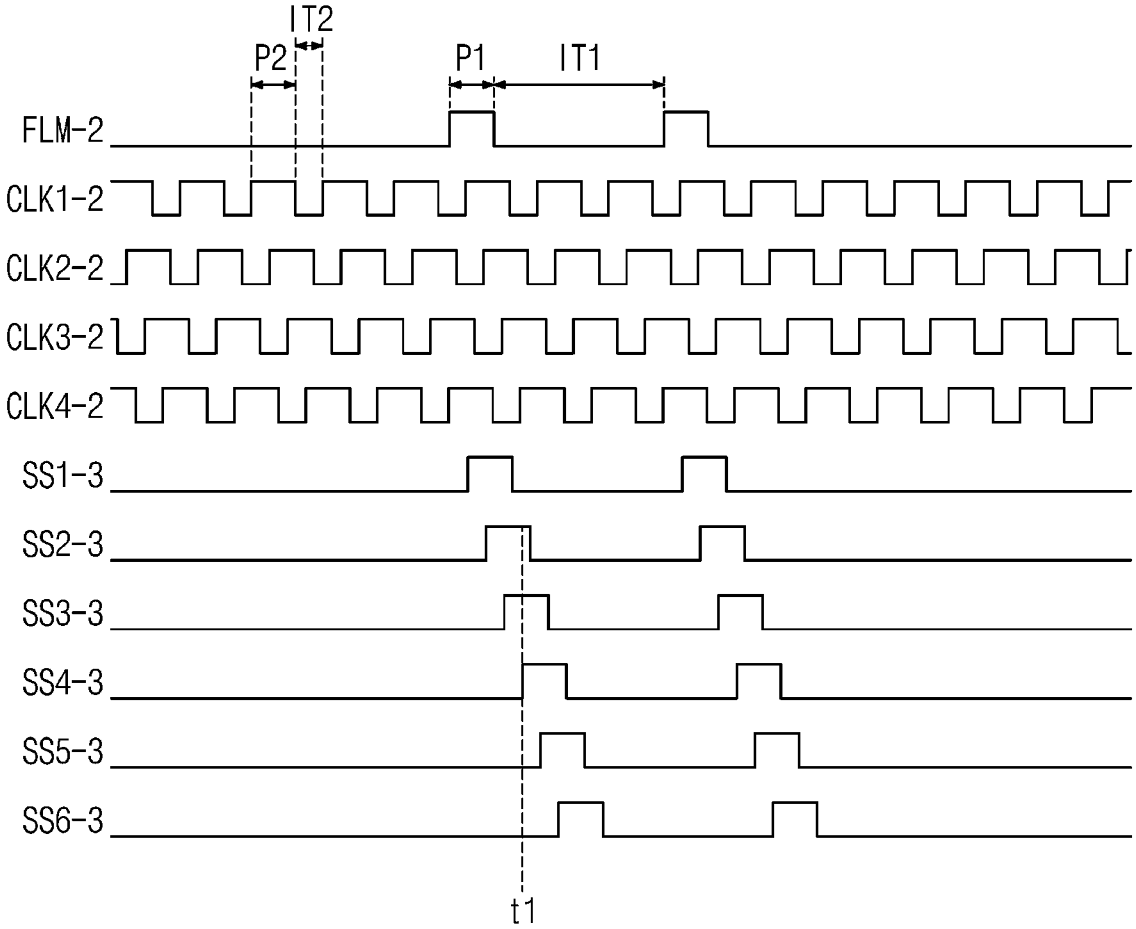
FIG. 22 is a waveform diagram illustrating an embodiment of a driving operation of a plurality of scan stages according to the disclosure.

FIG. 20 is a block diagram illustrating an embodiment of a scan driving circuit according to the disclosure, FIG. 21 is a circuit diagram illustrating an embodiment of a scan stage according to the disclosure, and FIG. 22 is a waveform diagram illustrating an embodiment of a driving operation of a plurality of scan stages according to the disclosure. In the description of FIG. 21, the components that are described with reference to FIG. 11 are marked by the same reference numerals/signs.

Referring to FIGS. 20 to 22, a scan driving circuit 100C2-3 may include a plurality of scan stages ST1-3, ST2-3, ST3-3, ST4-3, ST5-3, ST6-3, ST7-3, and ST8-3. Each of the plurality of scan stages ST1-3 to ST8-3 may receive at least two of a first clock signal CLK1-2, a second clock signal CLK2-2, a third clock signal CLK3-2, and a fourth clock signal CLK4-2. The plurality of scan stages ST1-3 to ST8-3 may respectively output scan signals SS1-3, SS2-3, SS3-3, SS4-3, SS5-3, SS6-3, SS7-3, and SS8-3. Enable signals EN1, EN2, EN3, and EN4 may be provided to the plurality of scan stages ST1-3 to ST8-3.

The plurality of scan stages ST1-3 to ST8-3 may include the first scan stage ST1-3, the second scan stage ST2-3, the third scan stage ST3-3, the fourth scan stage ST4-3, the fifth scan stage ST5-3, the sixth scan stage ST6-3, the seventh scan stage ST7-3, and the eighth scan stage ST8-3 arranged in order.

The plurality of scan stages ST1-3 to ST8-3 may respectively correspond to the plurality of scan lines SL1 to SLn (refer to FIG. 4) and may be respectively connected thereto.

The first scan stage ST1-3 among the plurality of scan stages ST1-3 to ST8-3 may receive the start signal FLM-2 as the carry signal CRY from the timing controller 100C1 (refer to FIG. 4).

The remaining scan stages ST2-3, ST3-3, ST4-3, ST5-3, ST6-3, ST7-3, and ST8-3 of the plurality of scan stages ST1-3 to ST8-3 may receive, as the carry signal CRY, the scan signals SS1-3, SS2-3, SS3-3, SS4-3, SS5-3, SS6-3, and SS7-3 respectively output from previous scan stages.

In the first scan stage ST1-3, the first clock signal CLK1-2 may be provided to the first input node IN1-1, and the second clock signal CLK2-2 may be provided to the second input node IN2-1. The first scan stage ST1-3 may include a ninth transistor T9-3.

The ninth transistor T9-3 may be connected between a first node N1 and a third node N3, and may include a gate electrode to which the first enable signal EN1 is provided. The third node N3 may be also referred to as the "second control node Q2" (refer to FIG. 7).

The first scan stage ST1-3 (also refer to FIG. 20) is illustrated in an embodiment of FIG. 21, but the remaining scan stages ST2-3 to ST8-3 may have the same configuration as the first scan stage ST1-3.

In the second scan stage ST2-3, the second clock signal CLK2-2 may be provided to the first input node IN1, and the third clock signal CLK3-2 may be provided to the second input node IN2. The second enable signal EN2 may be provided to the second scan stage ST2-3.

In the third scan stage ST3-3, the third clock signal CLK3-2 may be provided to the first input node IN1, and the fourth clock signal CLK4-2 may be provided to the second input node IN2. The first enable signal EN1 may be provided to the third scan stage ST3-3.

In the fourth scan stage ST4-3, the fourth clock signal CLK4-2 may be provided to the first input node IN1, and the fifth clock signal CLK5-2 may be provided to the second input node IN2. The second enable signal EN2 may be provided to the fourth scan stage ST4-3.

In the fifth scan stage ST5-3, the fifth clock signal CLK5-2 may be provided to the first input node IN1, and the sixth clock signal CLK6-2 may be provided to the second input node IN2. The third enable signal EN3 may be provided to the fifth scan stage ST5-3.

In the sixth scan stage ST6-3, the sixth clock signal CLK6-2 may be provided to the first input node IN1, and the seventh clock signal CLK7-2 may be provided to the second input node IN2. The fourth enable signal EN4 may be provided to the sixth scan stage ST6-3.

In the seventh scan stage ST7-3, the seventh clock signal CLK7-2 may be provided to the first input node IN1, and the eighth clock signal CLK8-2 may be provided to the second input node IN2. The third enable signal EN3 may be provided to the seventh scan stage ST7-3.

In the eighth scan stage ST8-3, the eighth clock signal CLK8-2 may be provided to the first input node IN1, and the first clock signal CLK1-2 may be provided to the second input node IN2. The fourth enable signal EN4 may be provided to the eighth scan stage ST8-3.

In this case, the enable signals EN1 to EN4 may satisfy conditions expressed by Equation 3 to Equation 5 below.

$$\text{enable count}>=\text{output overlapping count}+1 \quad \text{[Equation 3]}$$

$$\text{enable}(n)\neq\text{enable}(n+m) \quad \text{[Equation 4]}$$

$$t_{(next\ pulse)}(H)\neq t_{(1st\ pulse)}(H)+(n+m)\cdot H \quad \text{[Equation 5]}$$

In Equation 3, Equation 4, and Equation 5 above, the "n" may be a natural number, and the "m" may indicate the number of clock signals whose phases are different from each other.

In the embodiment illustrated in FIGS. 20 to 22, in Equation 3, Equation 4, and Equation 5 above, the "m" may be four.

The "enable count" may indicate the number of enable signals, and the "output" may indicate a scan signal. Scan signals overlapping each other at a given time t1 may include the second scan signal SS2-3, the third scan signal SS3-3, and the fourth scan signal SS4-3. That is, the number of scan signals overlapping each other may be 3, and the number of enable signals may be greater than or equal to 4 (=3+1). In an embodiment of the disclosure, the number of enable signals may be four.

Enable (n) may indicate an enable signal that is provided to an n-th scan stage. That is, an enable signal that is provided to the first scan stage ST1-3 may be different from an enable signal that is provided to the fifth scan stage ST5-3. As such, referring to FIG. 21, the first enable signal EN1 may be provided to the first scan stage ST1-3, and the third enable signal EN3 may be provided to the fifth scan stage ST5-3.

Equation 5 above may express the interval IT1 between toggle pulses of the start signal FLM-2. In an embodiment, the second toggle pulse may be expressed by "$t_{(next\ pulse)}$(H)", which is different from "$t_{(1st\ pulse)}$(H)+5H" being the first toggle pulse, for example. Referring to FIG. 22, the interval IT1 between toggle pulses may be set to 16 horizontal period 16H.

According to the disclosure, the following phenomenon may be prevented in the configuration where the start signal FLM-2 toggles twice or more during one frame: when the enable signals EN1 to EN4 and the start signal FLM-2 satisfy Equation 3 to Equation 5 above, the second toggle pulse experiences the interference due to the operation where the first toggle pulse of the start signal FLM-2 is masked. According to the above description, the display device DD (refer to FIG. 1) whose reliability is improved may be provided.

Figure 23:
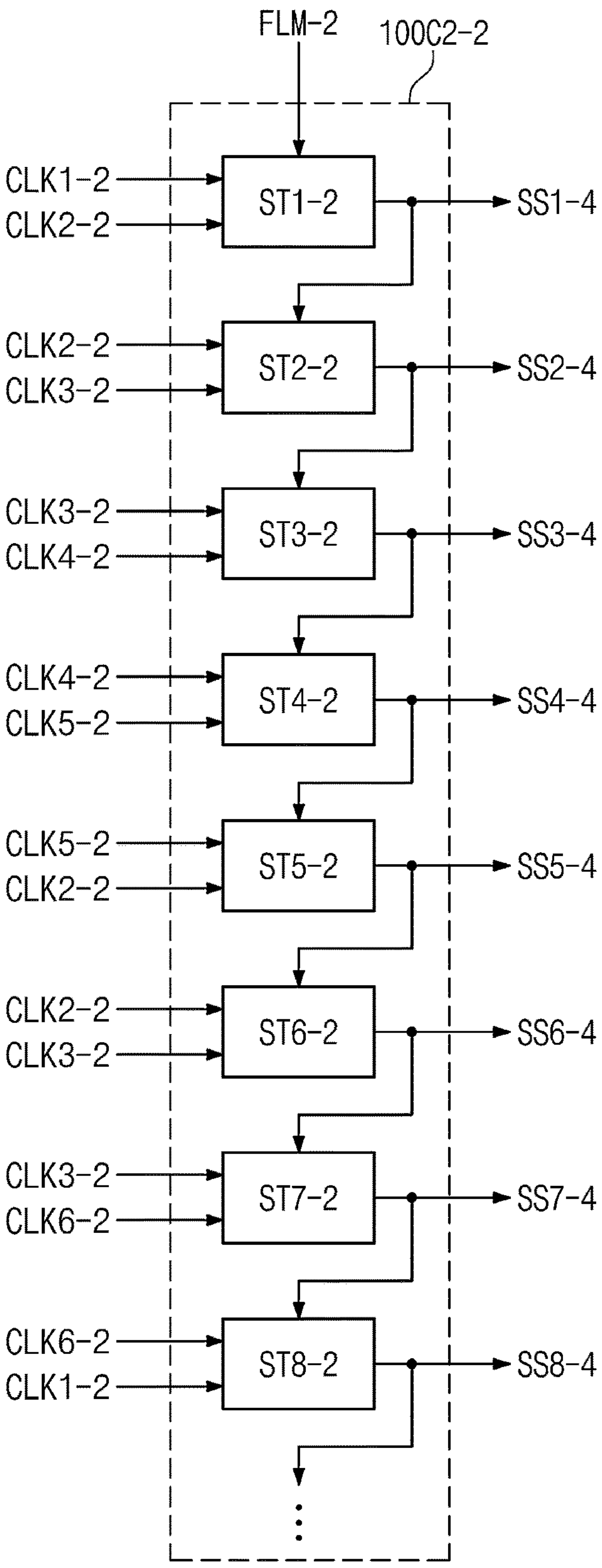
FIG. 23 is a block diagram illustrating an embodiment of a scan driving circuit according to the disclosure.

FIG. 23 is a block diagram illustrating an embodiment of a scan driving circuit according to the disclosure. In the description of FIG. 23, the components that are described with reference to FIG. 18 are marked by the same reference numerals/signs.

Referring to FIG. 23, each of the plurality of scan stages ST1-2 to ST8-2 may receive at least two of the first clock signal CLK1-2, the second clock signal CLK2-2, the third clock signal CLK3-2, the fourth clock signal CLK4-2, the fifth clock signal CLK5-2, and the sixth clock signal CLK6-2. The plurality of scan stages ST1-2 to ST8-2 may respectively output scan signals SS1-4, SS2-4, SS3-4, SS4-4, SS5-4, SS6-4, SS7-4, and SS8-4.

The plurality of scan stages ST1-2 to ST8-2 may respectively correspond to the plurality of scan lines SL1 to SLn (refer to FIG. 4) and may be respectively connected thereto.

In the first scan stage ST1-2, the first clock signal CLK1-2 may be provided to the first input node IN1, and the second clock signal CLK2-2 may be provided to the second input node IN2.

In the second scan stage ST2-2, the second clock signal CLK2-2 may be provided to the first input node IN1, and the third clock signal CLK3-2 may be provided to the second input node IN2.

In the third scan stage ST3-2, the third clock signal CLK3-2 may be provided to the first input node IN1, and the fourth clock signal CLK4-2 may be provided to the second input node IN2.

In the fourth scan stage ST4-2, the fourth clock signal CLK4-2 may be provided to the first input node IN1, and the fifth clock signal CLK5-2 may be provided to the second input node IN2.

In the fifth scan stage ST5-2, the fifth clock signal CLK5-2 may be provided to the first input node IN1, and the second clock signal CLK2-2 may be provided to the second input node IN2.

In the sixth scan stage ST6-2, the second clock signal CLK2-2 may be provided to the first input node IN1, and the third clock signal CLK3-2 may be provided to the second input node IN2.

In the seventh scan stage ST7-2, the third clock signal CLK3-2 may be provided to the first input node IN1, and the sixth clock signal CLK6-2 may be provided to the second input node IN2.

In the eighth scan stage ST8-2, the sixth clock signal CLK6-2 may be provided to the first input node IN1, and the first clock signal CLK1-2 may be provided to the second input node IN2.

In the multi-frequency mode MFM (refer to FIG. 3B), the timing controller 100C1 (refer to FIG. 4) may mask a partial period of the fifth clock signal CLK5-3 or the sixth clock signal CLK6-3 provided to a scan stage, which is connected to the second display area AA2 (refer to FIG. 3B), from among the plurality of scan stages ST1-2 to ST8-2.

According to the disclosure, in the multi-frequency mode MFM (refer to FIG. 3B), when the second driving frequency is 1 Hz, the second image IM2 (refer to FIG. 3B) may be displayed in the second display area DA2 (refer to FIGS. 1, 2A and 2B) only at the first frame F1 (refer to FIG. 3B); because the fifth clock signal CLK5-2 or the sixth clock signal CLK6-2 provided to the first input node IN1 is masked, an image may not be displayed at the remaining frames F2 to F120 (refer to FIG. 3B). Accordingly, the display device DD (refer to FIG. 1) in which power consumption is reduced may be provided.

According to the above description, in the multi-frequency mode, when the second driving frequency is 1 Hz, the second image may be displayed in the second display area only at a first frame; because the first clock signal is masked, an image may not be displayed at the first frame among the remaining frames. Accordingly, a display device in which power consumption is reduced may be provided.

Also, according to the above description, a display device that operates in the multi-frequency mode through a plurality of circuits without any other additional element and any other signal line except for a scan stage may be provided. The increase in the size of a scan stage may be minimized by connecting the first clock signal to the source node of the pull-up transistor and allowing the third circuit to receive the first clock signal and the second clock signal through the first circuit and the second circuit respectively. Accordingly, a display panel driving circuit in which the area of the non-display area is reduced and a display device including the same may be provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:

a display panel including a plurality of pixels respectively connected to a plurality of scan lines;

a scan driving circuit including:

a plurality of scan stages which respectively correspond to the plurality of scan lines and each of which receives a first clock signal, a second clock signal different from the first clock signal, and a carry signal and outputs a scan signal, each of the plurality of scan stages including:

a first circuit connected to a first input node of receiving one of the first clock signal and the second clock signal;

a second circuit connected to a second input node of receiving a remaining one of the first clock signal and the second clock signal;

a third circuit connected to a third input node of receiving the carry signal, the first circuit, and the second circuit and connected to a first control node and a second control node;

a pull-up transistor which is electrically connected to the first input node and an output node of outputting the scan signal and is turned on or off by the first control node; and a pull-down transistor which is electrically connected to the output node and a low-level voltage line and is turned on or off by the second control node; and a timing controller which divides the display panel into a first display area and a second display area during a multi-frequency mode and controls the scan driving circuit so that the first display area and the second display area operate at different frequencies from each other, wherein, in the multi-frequency mode, the timing controller masks a partial period of the first clock signal provided to a scan stage connected to the second display area from among the plurality of scan stages.

2. The display device of claim 1, wherein, in the first clock signal, a first voltage and a second voltage different from the first voltage are repeated at a given period.

3. The display device of claim 2, wherein the first voltage is higher in level than the second voltage, and wherein a phase of the second clock signal is opposite to a phase of the first clock signal.

4. The display device of claim 2, wherein, when the first clock signal is masked, each of the plurality of scan stages outputs the scan signal having the second voltage.

5. The display device of claim 2, wherein a masked first clock signal has the second voltage.

6. The display device of claim 2, wherein the second voltage is provided to the low-level voltage line.

7. The display device of claim 1, wherein each of the first circuit and the second circuit includes a NOT gate.

8. The display device of claim 1, wherein the third circuit includes:

a first shift register which is connected to the first input node and receives the carry signal; and a second shift register which is connected to the second input node, the first control node, and the second control node and receives a signal output from the first shift register.

9. The display device of claim 1, wherein the third circuit includes a latch.

10. The display device of claim 1, wherein the third circuit includes a flip-flop.

11. The display device of claim 1, wherein each of the pull-up transistor and the pull-down transistor is a p-channel metal-oxide-semiconductor transistor.

12. The display device of claim 1, wherein the first display area operates at a first driving frequency, and wherein the second display area operates at a second driving frequency lower than the first driving frequency.

13. The display device of claim 1, wherein the pull-up transistor includes a first source node connected to the first input node, a first drain node connected to the output node, and a first gate node connected to the first control node, and wherein the pull-down transistor includes a second source node connected to the output node, a second drain node connected to the low-level voltage line, and a second gate node connected to the second control node.

14. The display device of claim 1, wherein each of the pull-up transistor and the pull-down transistor is an n-channel metal-oxide-semiconductor transistor.

15. The display device of claim 1, wherein a first scan stage among the plurality of scan stages receives the carry signal from the timing controller, and wherein each of remaining scan stages of the plurality of scan stages receives, as the carry signal, the scan signal output from a previous scan stage.

16. A display panel driving circuit comprising:

a scan driving circuit including a scan stage which receives a first clock signal, a second clock signal different from the first clock signal, and a carry signal and to output a scan signal, the scan stage including:

a first circuit connected to a first input node of receiving the first clock signal;

a second circuit connected to a second input node of receiving the second clock signal;

a third circuit connected to a third input node of receiving the carry signal, the first circuit, and the second circuit and connected to a first control node and a second control node;

a pull-up transistor which is electrically connected to the first input node and an output node of outputting the scan signal and is turned on or off by the first control node; and a pull-down transistor which is electrically connected to the output node and a low-level voltage line and is turned on or off by the second control node; and a timing controller which controls the scan driving circuit.

17. The display panel driving circuit of claim 16, wherein the timing controller masks a partial period of the first clock signal provided to the scan stage.

18. The display panel driving circuit of claim 16, wherein each of the first circuit and the second circuit includes a NOT gate.

19. The display panel driving circuit of claim 16, wherein the third circuit includes:

A first shift register which is connected to the first input node and receives the carry signal; and a second shift register which is connected to the second input node, the first control node, and the second control node and receives a signal output from the first shift register.

20. The display panel driving circuit of claim 16, wherein the third circuit includes a latch or a flip-flop.

* * * * *